United States Patent
Fujiwara et al.

(10) Patent No.: US 12,382,170 B2
(45) Date of Patent: Aug. 5, 2025

(54) IMAGING APPARATUS, INFORMATION PROCESSING METHOD, AND PROGRAM

(71) Applicant: FUJIFILM Corporation, Tokyo (JP)

(72) Inventors: Shinya Fujiwara, Saitama (JP); Taro Saito, Saitama (JP); Yukinori Nishiyama, Saitama (JP); Takehiro Koguchi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 59 days.

(21) Appl. No.: 18/452,588

(22) Filed: Aug. 21, 2023

(65) Prior Publication Data
US 2023/0396882 A1 Dec. 7, 2023

Related U.S. Application Data

(63) Continuation of application No. PCT/JP2022/000091, filed on Jan. 5, 2022.

(30) Foreign Application Priority Data

Feb. 26, 2021 (JP) ................................ 2021-031217

(51) Int. Cl.
*H04N 23/67* (2023.01)
*H04N 23/698* (2023.01)
*H04N 23/958* (2023.01)

(52) U.S. Cl.
CPC ......... *H04N 23/672* (2023.01); *H04N 23/698* (2023.01); *H04N 23/958* (2023.01)

(58) Field of Classification Search
CPC .. H04N 23/672; H04N 23/698; H04N 23/667; H04N 23/611; H04N 23/62;
(Continued)

(56) References Cited

U.S. PATENT DOCUMENTS

| 2014/0253760 A1 | 9/2014 | Watanabe et al. |
| 2014/0347541 A1 | 11/2014 | Okazaki |

(Continued)

FOREIGN PATENT DOCUMENTS

| JP | H10197938 | 7/1998 |
| JP | 2010177741 | 8/2010 |

(Continued)

OTHER PUBLICATIONS

"International Search Report (Form PCT/ISA/210) of PCT/JP2022/000091", mailed on Feb. 15, 2022, with English translation thereof, pp. 1-7.

(Continued)

*Primary Examiner* — Shahbaz Nazrul
(74) *Attorney, Agent, or Firm* — JCIPRNET

(57) ABSTRACT

There is provided an imaging apparatus including an image sensor, and a processor, in which the processor is configured to acquire information related to distances at a plurality of positions within an imaging area of the image sensor, generate moving image data represented with a vertical axis and a lateral axis, based on imaging data obtained by the image sensor, generate distance image data in which a first axis corresponds to the vertical axis or the lateral axis and a second axis represents the information related to the distance, and output the moving image data and the distance image data.

17 Claims, 24 Drawing Sheets

(58) Field of Classification Search
CPC .... H04N 23/631; H04N 23/633; H04N 23/69; H04N 23/958; G02B 7/28; G03B 7/00; G03B 13/36; G03B 15/00; G03B 17/02; G03B 17/18

See application file for complete search history.

(56) References Cited

U.S. PATENT DOCUMENTS

| | | | |
|---|---|---|---|
| 2015/0373257 A1 | 12/2015 | Shirakawa | |
| 2016/0134807 A1 | 5/2016 | Tsutsumi | |
| 2019/0394409 A1* | 12/2019 | Matsumoto | H04N 23/63 |
| 2020/0259995 A1* | 8/2020 | Ito | G06F 3/04817 |
| 2020/0410279 A1 | 12/2020 | Matsuoka | |
| 2020/0412938 A1* | 12/2020 | Shibuno | H04N 23/663 |
| 2020/0412968 A1* | 12/2020 | Shibuno | H04N 23/959 |
| 2021/0287343 A1* | 9/2021 | Kaida | H04N 23/80 |
| 2022/0351395 A1* | 11/2022 | Inagaki | G06T 7/571 |
| 2024/0046477 A1* | 2/2024 | Feng | H04N 5/2226 |

FOREIGN PATENT DOCUMENTS

| | | |
|---|---|---|
| JP | 2012124555 | 6/2012 |
| JP | 2012230258 | 11/2012 |
| JP | 2014078826 | 5/2014 |
| JP | 2015004960 | 1/2015 |
| JP | 2015188251 | 10/2015 |
| JP | 2019169769 | 10/2019 |
| WO | 2014129127 | 8/2014 |

OTHER PUBLICATIONS

"Written Opinion of the International Searching Authority (Form PCT/ISA/237) of PCT/ JP2022/000091", mailed on Feb. 15, 2022, with English translation thereof, pp. 1-8.

* cited by examiner

IMAGING APPARATUS, INFORMATION PROCESSING METHOD, AND PROGRAM

CROSS-REFERENCE TO RELATED APPLICATION

This application is a continuation application of International Application No. PCT/JP2022/000091, filed Jan. 5, 2022, the disclosure of which is incorporated herein by reference in its entirety. Further, this application claims priority from Japanese Patent Application No. 2021-031217 filed on Feb. 26, 2021, the disclosure of which is incorporated herein by reference in its entirety.

BACKGROUND

1. Technical Field

The present disclosed technology relates to an imaging apparatus, an information processing method, and a program.

2. Description of the Related Art

JP2012-230258A discloses an imaging apparatus that generates a TV-AF evaluation value signal by extracting high-frequency components from a video signal in a predetermined region within a screen and that captures outputs of pixels, which are used for focus detection of an imaging element, into two output signals of an A image and a B image. The imaging apparatus described in JP2012-230258A performs a phase difference distance measurement calculation in order to obtain a focus deviation amount of each portion of an imaging area and generates a distance map. In a case of displaying a distance bar for adjusting a focus, the maximum value of a scale is obtained according to the distance map, and the distance bar is displayed by setting the scale at equal intervals or logarithmic intervals.

JP2019-169769A discloses an image processing apparatus including an imaging unit that images a subject and a distance map acquisition unit that acquires information, which is related to a distance distribution of the subject, as map data. The distance map acquisition unit acquires the distance map data or map data of an image shift amount or defocus amount associated with a captured image by using a time of flight (TOF) method, an imaging surface phase difference detection method using a pupil-splitting type imaging element, or the like. The image processing unit generates texture image data in which low-frequency components of the captured image are suppressed and generates image data that represents the distance distribution of the subject by combining the texture image data and the map data that is acquired by the distance map acquisition unit.

JP1998-197938A (JP-H10-197938A) discloses a camera including a stop position detection unit that detects a drive position of each driving unit of the camera, a focus position detection unit, a zoom position detection unit, and a display element in which small striped display bodies are arranged along the distance scale in order to display an appropriate distance range for focusing in a finder. In the camera described in JP1998-197938A (JP-H10-197938A), a microcomputer controls the display element to be displayed in the appropriate distance range that is calculated based on the above-described detected data. Further, a display mechanism for the appropriate distance range can be disposed on a lens barrel portion, and display of these appropriate distance ranges can be represented by the perspective method.

SUMMARY

One embodiment according to the present disclosed technology provides an imaging apparatus, an information processing method, and a program that allow a user to easily visually recognize a distance of a subject.

An imaging apparatus of the present disclosure comprises: an image sensor; and a processor, in which the processor is configured to: acquire information related to distances at a plurality of positions within an imaging area of the image sensor; generate moving image data represented with a vertical axis and a lateral axis, based on imaging data obtained by the image sensor; generate distance image data in which a first axis corresponds to the vertical axis or the lateral axis and a second axis represents the information related to the distance; and output the moving image data and the distance image data.

It is preferable that the processor outputs the moving image data and the distance image data to a display destination.

It is preferable that the distance image data includes information representing at least one of a first mark that indicates a focusing distance or a second mark that indicates a depth of field.

It is preferable that a focus lens is included and the processor is configured to perform control of moving the focus lens to a position corresponding to the focusing distance represented by the first mark, in a case where an operation of changing a position of the first mark along the second axis is received.

It is preferable that a stop is included and the processor is configured to perform control of changing a stop value of the stop to a stop value corresponding to the depth of field represented by the second mark, in a case where an operation of changing a position of the second mark along the second axis is received.

It is preferable that the processor is configured to control at least one of the focus lens or the stop with a range in which a target subject in the moving image data is within the depth of field, in a case where the operation of changing the position of the first mark or the second mark is performed.

It is preferable that the target subject is a subject extracted by the processor based on the moving image data.

It is preferable that the target subject is a subject obtained by the processor extracting a designated region, which is designated in the moving image data, in a case where an operation of designating a region in the moving image data is performed.

It is preferable that the processor is configured to perform processing of enlarging the distance image data in a direction of the second axis, in a case where an operation of widening the depth of field by using the second mark is performed.

It is preferable that the processor is configured to perform processing of enlarging the distance image data in a direction of the second axis, in a case where a state in which an operation speed is equal to or lower than a certain speed continues for a certain period of time during the operation of changing the position of the first mark or the second mark.

It is preferable that the processor is configured to, in the moving image data, change color of a pixel group corresponding to a region designated in the distance image data, in a case where an operation of designating the region in the distance image data is performed.

It is preferable that the processor is configured to, in the distance image data, change color of a pixel group corresponding to a region designated in the moving image data, in a case where an operation of designating the region in the moving image data is performed.

It is preferable that the processor is configured to: extract a subject region based on the moving image data; acquire information related to the distance corresponding to the extracted subject region; and generate the distance image data based on the acquired information related to the distance.

It is preferable that the processor is configured to: extract a designated region, which is designated in the moving image data, in a case where an operation of designating a region in the moving image data is performed; acquire information related to the distance corresponding to the extracted designated region; and generate the distance image data based on the acquired information related to the distance.

It is preferable that the processor is configured to acquire the information related to the distance based on the imaging data obtained by the image sensor.

It is preferable that the image sensor includes a plurality of phase difference pixels, and the processor is configured to acquire the information related to the distance based on, among the imaging data, imaging data that is obtained from the phase difference pixel.

It is preferable that the phase difference pixel is capable of selectively outputting non-phase difference image data, which is obtained by performing photoelectric conversion in an entire region of a pixel, and phase difference image data, which is obtained by performing the photoelectric conversion in a part of region of the pixel, and the processor is configured to acquire the information related to the distance based on the imaging data in a case where the phase difference pixel outputs the phase difference image data.

An information processing method of the present disclosure comprises: acquiring information related to distances at a plurality of positions within an imaging area of an image sensor; generating moving image data represented with a vertical axis and a lateral axis, based on imaging data obtained by the image sensor; generating distance image data in which a first axis corresponds to the vertical axis or the lateral axis and a second axis represents the information related to the distance; and outputting the moving image data and the distance image data.

A program of the present disclosure that causes a computer to execute a process comprises: acquiring information related to distances at a plurality of positions within an imaging area of an image sensor; generating moving image data represented with a vertical axis and a lateral axis, based on imaging data obtained by the image sensor; generating distance image data in which a first axis corresponds to the vertical axis or the lateral axis and a second axis represents the information related to the distance; and outputting the moving image data and the distance image data.

BRIEF DESCRIPTION OF THE DRAWINGS

Exemplary embodiments according to the technique of the present disclosure will be described in detail based on the following figures, wherein.

DETAILED DESCRIPTION

Hereinafter, an example of an imaging apparatus, an information processing method, and a program according to the present disclosed technology will be described with reference to the accompanying drawings.

First, the wording used in the following description will be described.

CPU refers to an abbreviation of a "Central Processing Unit". GPU refers to an abbreviation of a "Graphics Processing Unit". TPU refers to an abbreviation of a "Tensor processing unit". NVM refers to an abbreviation of a "Non-volatile memory". RAM refers to an abbreviation of a "Random Access Memory". IC refers to an abbreviation of an "Integrated Circuit". ASIC refers to an abbreviation of an "Application Specific Integrated Circuit". PLD refers to an abbreviation of a "Programmable Logic Device". FPGA refers to an abbreviation of a "Field-Programmable Gate Array". SoC refers to an abbreviation of a "System-on-a-chip". SSD refers to an abbreviation of a "Solid State Drive". USB refers to an abbreviation of a "Universal Serial Bus". HDD refers to an abbreviation of a "Hard Disk Drive". EEPROM refers to an abbreviation of an "Electrically Erasable and Programmable Read Only Memory". EL refers to an abbreviation of "Electro-Luminescence". I/F refers to an abbreviation of an "Interface". UI refers to an abbreviation of a "User Interface". fps refers to an abbreviation of a "frame per second". MF refers to an abbreviation of "Manual Focus". AF refers to an abbreviation of "Auto Focus". CMOS refers to an abbreviation of a "Complementary Metal Oxide Semiconductor". CCD refers to an abbreviation of a "Charge Coupled Device". A/D refers to an abbreviation of "Analog/Digital". PC refers to an abbreviation of "Personal Computer".

Figure 1:
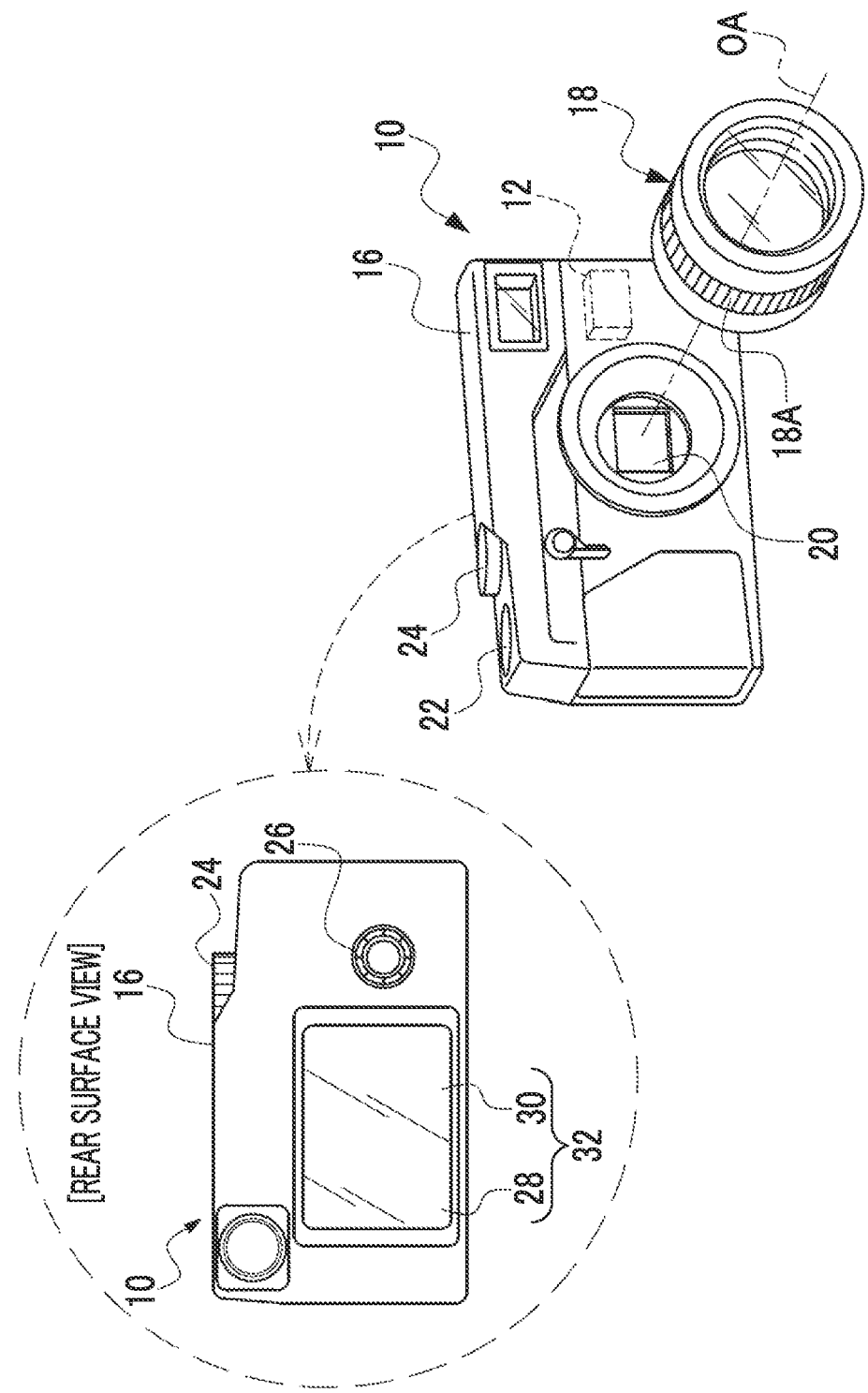
FIG. 1 is a schematic configuration diagram showing an example of a configuration of an entire imaging apparatus.

As an example shown in FIG. 1, the imaging apparatus 10 is an apparatus for imaging a subject and includes a processor 12, an imaging apparatus main body 16, and an interchangeable lens 18. The processor 12 is an example of a "computer" according to the present disclosed technology. The processor 12 is built into the imaging apparatus main body 16 and controls the entire imaging apparatus 10. The interchangeable lens 18 is interchangeably attached to the imaging apparatus main body 16. The interchangeable lens 18 is provided with a focus ring 18A. In a case where a user or the like of the imaging apparatus 10 (hereinafter, simply referred to as the "user") manually adjusts the focus on the subject by the imaging apparatus 10, the focus ring 18A is operated by the user or the like.

In the example shown in FIG. 1, a lens-interchangeable digital camera is shown as an example of the imaging apparatus 10. However, this is only an example, and a digital camera with a fixed lens may be used or a digital camera, which is built into various electronic devices such as a smart device, a wearable terminal, a cell observation device, an ophthalmologic observation device, or a surgical microscope may be used.

An image sensor 20 is provided in the imaging apparatus main body 16. The image sensor 20 is an example of an "image sensor" according to the present disclosed technology. The image sensor 20 is a CMOS image sensor. The image sensor 20 captures an imaging area including at least one subject. In a case where the interchangeable lens 18 is attached to the imaging apparatus main body 16, subject light indicating the subject is transmitted through the interchangeable lens 18 and imaged on the image sensor 20, and then image data indicating an image of the subject is generated by the image sensor 20.

In the present embodiment, although the CMOS image sensor is exemplified as the image sensor 20, the present disclosed technology is not limited to this, for example, the present disclosed technology is established even in a case where the image sensor 20 is another type of image sensor such as a CCD image sensor.

A release button 22 and a dial 24 are provided on an upper surface of the imaging apparatus main body 16. The dial 24 is operated in a case where an operation mode of an imaging system, an operation mode of a playback system, and the like are set, and by operating the dial 24, an imaging mode, a playback mode, and a setting mode are selectively set as the operation mode in the imaging apparatus 10. The imaging mode is an operation mode in which the imaging is performed with respect to the imaging apparatus 10. The playback mode is an operation mode for playing the image (for example, a still image and/or a moving image) obtained by the performance of the imaging for recording in the imaging mode. The setting mode is an operation mode for setting the imaging apparatus 10 in a case where various set values used in the control related to the imaging are set.

The release button 22 functions as an imaging preparation instruction unit and an imaging instruction unit, and is capable of detecting a two-step pressing operation of an imaging preparation instruction state and an imaging instruction state. The imaging preparation instruction state refers to a state in which the release button 22 is pressed, for example, from a standby position to an intermediate position (half pressing position), and the imaging instruction state refers to a state in which the release button 22 is pressed to a final pressed position (fully pressing position) beyond the intermediate position. In the following, the "state of being pressed from the standby position to the half pressing position" is referred to as a "half pressing state", and the "state of being pressed from the standby position to the full pressed position" is referred to as a "fully pressing state". Depending on the configuration of the imaging apparatus 10, the imaging preparation instruction state may be a state in which the user's finger is in contact with the release button 22, and the imaging instruction state may be a state in which the operating user's finger is moved from the state of being in contact with the release button 22 to the state of being away from the release button 22.

An instruction key 26 and a touch panel display 32 are provided on a rear surface of the imaging apparatus main body 16.

Figure 2:
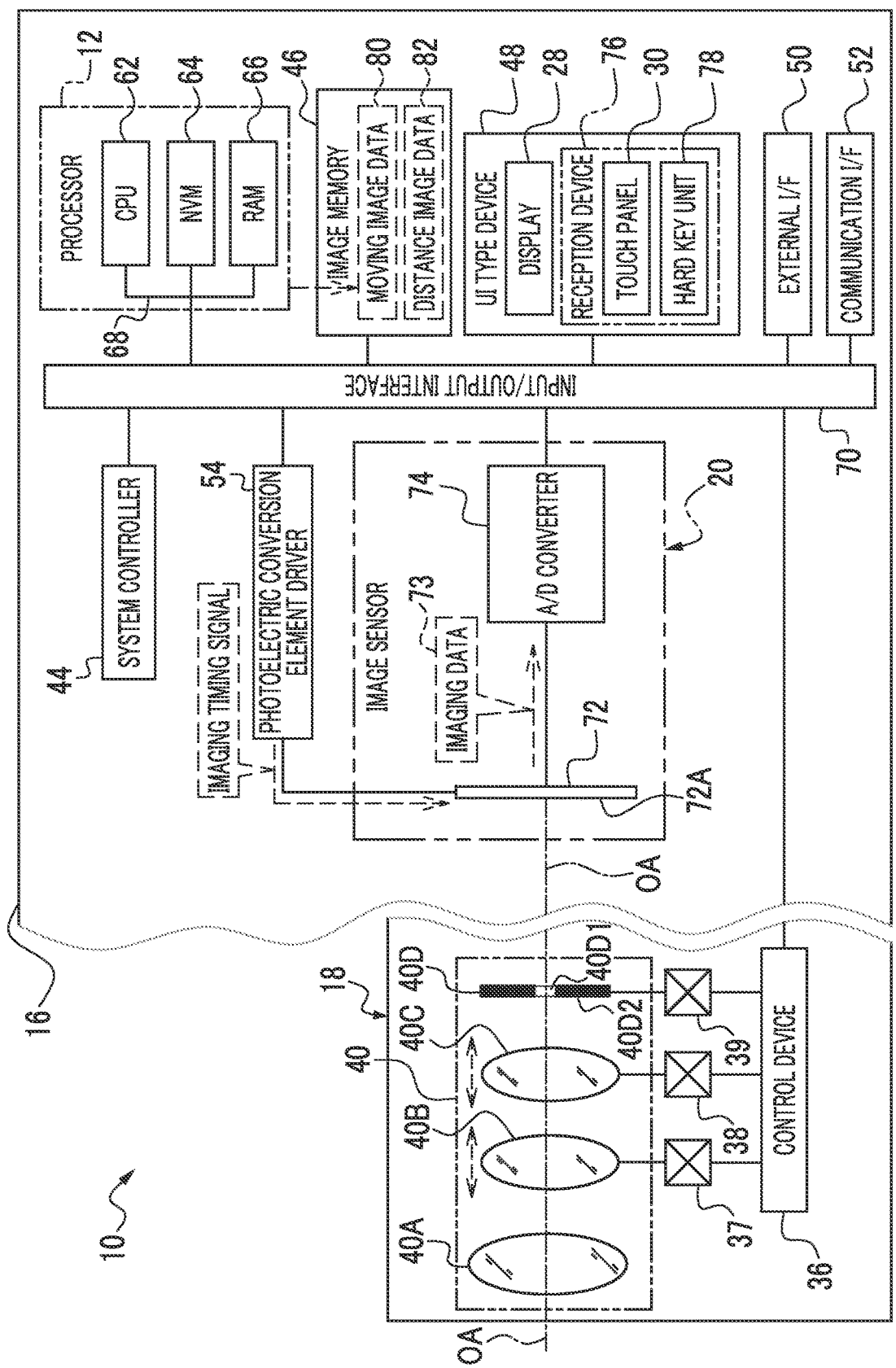
FIG. 2 is a schematic configuration diagram showing an example of hardware configurations of an optical system and an electrical system of the imaging apparatus.

The touch panel display 32 includes a display 28 and a touch panel 30 (see also FIG. 2). Examples of the display 28 include an EL display (for example, an organic EL display or an inorganic EL display). The display 28 may not be an EL display but may be another type of display such as a liquid crystal display.

The display 28 displays image and/or character information and the like. The display 28 is used for imaging for a live view image, that is, for displaying a live view image obtained by performing the continuous imaging in a case where the imaging apparatus 10 is in the imaging mode. Here, the "live view image" refers to a moving image for display based on the image data obtained by being imaged by the image sensor 20. The imaging, which is performed to obtain the live view image (hereinafter, also referred to as "imaging for a live view image"), is performed according to, for example, a frame rate of 60 fps. 60 fps is only an example, and a frame rate of fewer than 60 fps may be used, or a frame rate of more than 60 fps may be used.

The display 28 is also used for displaying a still image obtained by the performance of the imaging for a still image in a case where an instruction for performing the imaging for a still image is provided to the imaging apparatus 10 via the release button 22. The display 28 is also used for displaying a playback image or the like in a case where the imaging apparatus 10 is in the playback mode. Further, the display 28 is also used for displaying a menu screen where various menus can be selected and displaying a setting screen for setting the various set values used in control related to the imaging in a case where the imaging apparatus 10 is in the setting mode.

The touch panel 30 is a transmissive touch panel and is superimposed on a surface of a display region of the display 28. The touch panel 30 receives the instruction from the user by detecting contact with an indicator such as a finger or a stylus pen. In the following, for convenience of explanation, the above-mentioned "fully pressing state" includes a state in which the user turns on a softkey for starting the imaging via the touch panel 30.

In the present embodiment, although an out-cell type touch panel display in which the touch panel 30 is superimposed on the surface of the display region of the display 28 is exemplified as an example of the touch panel display 32, this is only an example. For example, as the touch panel display 32, an on-cell type or in-cell type touch panel display can be applied.

The instruction key 26 receives various instructions. Here, the "various instructions" refer to, for example, various instructions such as an instruction for displaying the menu screen, an instruction for selecting one or a plurality of menus, an instruction for confirming a selected content, an instruction for erasing the selected content, zooming in, zooming out, frame forwarding, and the like. Further, these instructions may be provided by the touch panel 30.

As an example shown in FIG. 2, the image sensor 20 includes photoelectric conversion elements 72. The photoelectric conversion elements 72 have a light-receiving surface 72A. The photoelectric conversion elements 72 are disposed in the imaging apparatus main body 16 such that the center of the light-receiving surface 72A and an optical axis OA coincide with each other (see also FIG. 1). The photoelectric conversion elements 72 have a plurality of photosensitive pixels 72B (see FIG. 3) arranged in a matrix shape, and the light-receiving surface 72A is formed by the plurality of photosensitive pixels. Each photosensitive pixel 72B has a micro lens 72C (see FIG. 3). The photosensitive pixel 72B is a physical pixel having a photodiode (not shown), which photoelectrically converts the received light and outputs an electric signal according to a light-receiving amount.

Further, red (R), green (G), or blue (B) color filters (not shown) are arranged in a matrix shape in a default pattern arrangement (for example, Bayer arrangement, G stripe R/G complete checkered pattern, X-Trans (registered trademark) arrangement, honeycomb arrangement, or the like) on the plurality of photosensitive pixels 72B.

In the following, for convenience of explanation, a photosensitive pixel 72B having a micro lens 72C and an R color filter is referred to as an R pixel, a photosensitive pixel 72B having a micro lens 72C and a G color filter is referred to as a G pixel, and a photosensitive pixel 72B having a micro lens 72C and a B color filter is referred to as a B pixel. Further, in the following, for convenience of explanation, the electric signal output from the R pixel is referred to as an "R signal", the electric signal output from the G pixel is referred to as a "G signal", and the electric signal output from the B pixel is referred to as a "B signal".

The interchangeable lens 18 includes an imaging lens 40. The imaging lens 40 has an objective lens 40A, a focus lens 40B, a zoom lens 40C, and a stop 40D. The objective lens 40A, the focus lens 40B, the zoom lens 40C, and the stop 40D are disposed in the order of the objective lens 40A, the focus lens 40B, the zoom lens 40C, and the stop 40D along the optical axis OA from the subject side (object side) to the imaging apparatus main body 16 side (image side).

Further, the interchangeable lens 18 includes a control device 36, a first actuator 37, a second actuator 38, and a third actuator 39. The control device 36 controls the entire interchangeable lens 18 according to the instruction from the imaging apparatus main body 16. The control device 36 is a device having a computer including, for example, a CPU, an NVM, a RAM, and the like. The NVM of the control device 36 is, for example, an EEPROM. However, this is only an example, and an HDD and/or SSD or the like may be applied as the NVM of a system controller 44 instead of or together with the EEPROM. Further, the RAM of the control device 36 temporarily stores various types of information and is used as a work memory. In the control device 36, the CPU reads a necessary program from the NVM and executes the read various programs on the RAM to control the entire imaging lens 40.

Although a device having a computer is exemplified here as an example of the control device 36, this is only an example, and a device including an ASIC, FPGA, and/or PLD may be applied. Further, as the control device 36, for example, a device implemented by a combination of a hardware configuration and a software configuration may be used.

The first actuator 37 includes a slide mechanism for focus(not shown) and a motor for focus (not shown). The focus lens 40B is attached to the slide mechanism for focus so as to be slidable along the optical axis OA. Further, the motor for focus is connected to the slide mechanism for focus, and the slide mechanism for focus operates by receiving the power of the motor for focus to move the focus lens 40B along the optical axis OA.

The second actuator 38 includes a slide mechanism for zoom (not shown) and a motor for zoom (not shown). The zoom lens 40C is attached to the slide mechanism for zoom so as to be slidable along the optical axis OA. Further, the motor for zoom is connected to the slide mechanism for zoom, and the slide mechanism for zoom operates by receiving the power of the motor for zoom to move the zoom lens 40C along the optical axis OA.

The third actuator 39 includes a power transmission mechanism (not shown) and a motor for stop (not shown). The stop 40D has an opening 40D1 and is a stop in which the size of the opening 40D1 is variable. The opening 40D1 is formed by a plurality of stop leaf blades 40D2, for example. The plurality of stop leaf blades 40D2 are connected to the power transmission mechanism. Further, the motor for stop is connected to the power transmission mechanism, and the power transmission mechanism transmits the power of the motor for stop to the plurality of stop leaf blades 40D2. The plurality of stop leaf blades 40D2 receives the power that is transmitted from the power transmission mechanism and changes the size of the opening 40D1 by being operated. The stop 40D adjusts the exposure by changing the size of the opening 40D1.

The motor for focus, the motor for zoom, and the motor for stop are connected to the control device 36, and the control device 36 controls each drive of the motor for focus, the motor for zoom, and the motor for stop. In the present embodiment, a stepping motor is adopted as an example of the motor for focus, the motor for zoom, and the motor for stop. Therefore, the motor for focus, the motor for zoom, and the motor for stop operate in synchronization with a pulse signal in response to a command from the control device 36. Although an example in which the motor for focus, the motor for zoom, and the motor for stop are provided in the interchangeable lens 18 has been described here, this is only an example, and at least one of the motor for focus, the motor for zoom, or the motor for stop may be provided in the imaging apparatus main body 16. The constituent and/or operation method of the interchangeable lens 18 can be changed as needed.

In the imaging apparatus 10, in the case of the imaging mode, an MF mode and an AF mode are selectively set according to the instructions provided to the imaging apparatus main body 16. The MF mode is an operation mode for manually focusing. In the MF mode, for example, by operating the focus ring 18A or the like by the user, the focus lens 40B is moved along the optical axis OA with the movement amount according to the operation amount of the focus ring 18A or the like, thereby the focus is adjusted.

In the AF mode, the imaging apparatus main body 16 calculates a focusing position according to a subject distance and adjusts the focus by moving the focus lens 40B toward the calculated focusing position. Here, the focusing position refers to a position of the focus lens 40B on the optical axis OA in a state of being in focus.

The imaging apparatus main body 16 includes the image sensor 20, the processor 12, the system controller 44, an image memory 46, a UI type device 48, an external I/F 50, a communication I/F 52, a photoelectric conversion element driver 54, and an input/output interface 70. Further, the image sensor 20 includes the photoelectric conversion elements 72 and an A/D converter 74.

The processor 12, the image memory 46, the UI type device 48, the external I/F 50, the photoelectric conversion element driver 54, and the A/D converter 74 are connected to the input/output interface 70. Further, the control device 36 of the interchangeable lens 18 is also connected to the input/output interface 70.

The system controller 44 includes a CPU (not shown), an NVM (not shown), and a RAM (not shown). In the system controller 44, the NVM is a non-temporary storage medium and stores various parameters and various programs. The NVM of the system controller 44 is, for example, an EEPROM. However, this is only an example, and an HDD and/or SSD or the like may be applied as the NVM of a system controller 44 instead of or together with the EEPROM. Further, the RAM of the system controller 44 temporarily stores various types of information and is used as a work memory. In the system controller 44, the CPU reads a necessary program from the NVM and executes the read various programs on the RAM to control the entire imaging apparatus 10. That is, in the example shown in FIG. 2, the processor 12, the image memory 46, the UI type device 48, the external I/F 50, the communication I/F 52, the photoelectric conversion element driver 54, and the control device 36 are controlled by the system controller 44.

The processor 12 operates under the control of the system controller 44. The processor 12 includes a CPU 62, an NVM 64, and a RAM 66.

The CPU 62, the NVM 64, and the RAM 66 are connected via a bus 68, and the bus 68 is connected to the input/output interface 70. In the example shown in FIG. 2, one bus is shown as the bus 68 for convenience of illustration, but a plurality of buses may be used. The bus 68 may be a serial bus or may be a parallel bus including a data bus, an address bus, a control bus, and the like.

The NVM 64 is a non-temporary storage medium and stores various parameters and various programs, which are different from the various parameters and various programs stored in the NVM of the system controller 44. The various programs include a program 65 (see FIG. 4), which will be described later. For example, the NVM 64 is an EEPROM. However, this is only an example, and an HDD and/or SSD or the like may be applied as the NVM 64 instead of or together with the EEPROM. Further, the RAM 66 temporarily stores various types of information and is used as a work memory.

The CPU 62 reads a necessary program from the NVM 64 and executes the read program in the RAM 66. The CPU 62 performs image processing according to a program executed on the RAM 66.

The photoelectric conversion element driver 54 is connected to the photoelectric conversion elements 72. The photoelectric conversion element driver 54 supplies an imaging timing signal, which defines the timing of the imaging performed by the photoelectric conversion elements 72, to the photoelectric conversion elements 72 according to an instruction from the CPU 62. The photoelectric conversion elements 72 perform reset, exposure, and output of an electric signal according to the imaging timing signal supplied from the photoelectric conversion element driver 54. Examples of the imaging timing signal include a vertical synchronization signal, and a horizontal synchronization signal.

In a case where the interchangeable lens 18 is attached to the imaging apparatus main body 16, the subject light incident on the imaging lens 40 is imaged on the light-receiving surface 72A by the imaging lens 40. Under the control of the photoelectric conversion element driver 54, the photoelectric conversion elements 72 photoelectrically convert the subject light, which is received from the light-receiving surface 72A and output the electric signal corresponding to the amount of light of the subject light to the A/D converter 74 as imaging data 73 indicating the subject light. Specifically, the A/D converter 74 reads the imaging data 73 from the photoelectric conversion elements 72 in units of one frame and for each horizontal line by using an exposure sequential reading method.

The A/D converter 74 digitizes the analog imaging data 73 that is read from the photoelectric conversion element 72. The imaging data 73, which is digitized by the A/D converter 74, is so-called RAW image data, and represents an image in which R pixels, G pixels, and B pixels are arranged in a mosaic shape. Further, in the present embodiment, as an example, the number of bits of each of the R pixel, the B pixel, and the G pixel included in the RAW image data, that is, the length of the bits is 14 bits.

In the present embodiment, as an example, the CPU 62 of the processor 12 acquires the imaging data 73 from the A/D converter 74 and performs image processing on the acquired imaging data 73. In the present embodiment, the processor 12 generates moving image data 80 and distance image data 82 based on the imaging data 73. The moving image data 80 and the distance image data 82 are stored in the image memory 46. In the present embodiment, the moving image data 80 is moving image data used for displaying the live view image. The distance image data 82 is image data for displaying distances of a plurality of subjects in the imaging area.

The UI type device 48 comprises a display 28. The CPU 62 displays the moving image data 80 and the distance image data 82, which are stored in the image memory 46, on the display 28. Further, the CPU 62 displays various types of information on the display 28.

Further, the UI type device 48 includes a reception device 76. The reception device 76 includes a touch panel 30 and a hard key unit 78. The hard key unit 78 is a plurality of hard keys including an instruction key 26 (see FIG. 1). The CPU 62 operates according to various instructions received by using the touch panel 30. Here, although the hard key unit 78 is included in the UI type device 48, the present disclosed technology is not limited to this, for example, the hard key unit 78 may be connected to the external I/F 50.

The external I/F 50 controls the exchange of various information between the imaging apparatus 10 and an apparatus existing outside the imaging apparatus 10 (hereinafter, also referred to as an "external apparatus"). Examples of the external I/F 50 include a USB interface. The external apparatus (not shown) such as a smart device, a personal computer, a server, a USB memory, a memory card, and/or a printer is directly or indirectly connected to the USB interface.

The communication I/F 52 is connected to a network (not shown). The communication I/F 52 controls the exchange of information between a communication device (not shown) such as a server on the network and the system controller 44. For example, the communication I/F 52 transmits information in response to a request from the system controller 44 to the communication device via the network. Further, the communication I/F 52 receives the information transmitted from the communication device and outputs the received information to the system controller 44 via the input/output interface 70.

Figure 3:
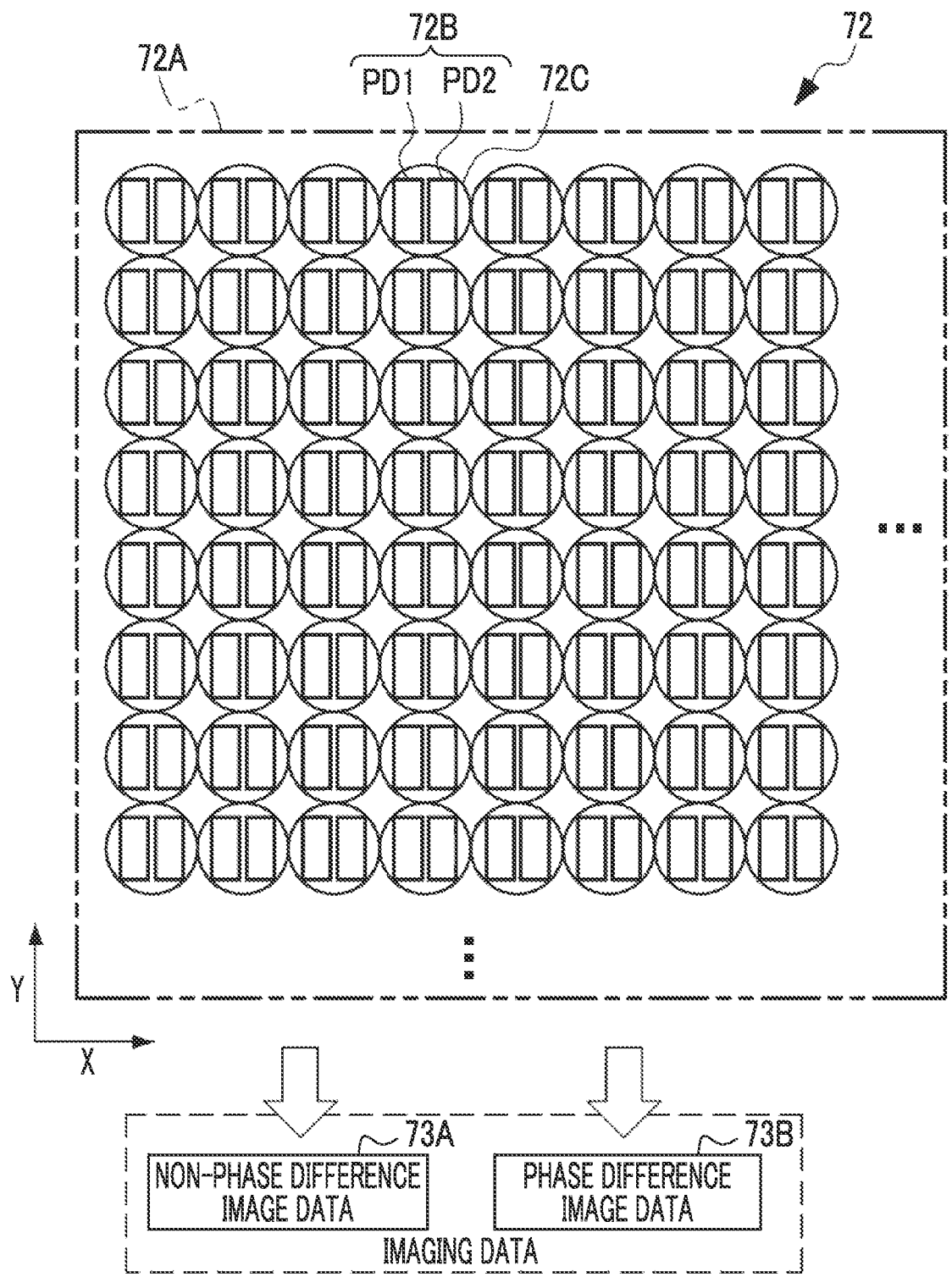
FIG. 3 is a schematic configuration diagram showing an example of a configuration of a photoelectric conversion element.

As an example shown in FIG. 3, in the present embodiment, photosensitive pixels 72B, which includes a pair of independent photodiodes PD1 and PD2, are two-dimensionally arranged on a light-receiving surface 72A of the photoelectric conversion element 72. In FIG. 3, one direction that is parallel to the light-receiving surface 72A is defined as the X direction, and a direction orthogonal to the X direction is defined as the Y direction. The photosensitive pixels 72B are arranged along the X direction and the Y direction.

The photodiode PD1 performs photoelectric conversion on a luminous flux that passes through a first pupil portion region in the imaging lens 40. The photodiode PD2 performs photoelectric conversion on a luminous flux that passes through a second pupil portion region in the imaging lens 40. A color filter (not shown) and a micro lens 72C are disposed in each of the photosensitive pixels 72B.

The photoelectric conversion element 72 having a configuration shown in FIG. 3 is an image plane phase difference type photoelectric conversion element in which a pair of photodiodes PD1 and PD2 are provided for one pixel. In the present embodiment, the photoelectric conversion element 72 also has a function of outputting data that is related to the imaging and the phase difference by the photosensitive pixels 72B. In a case where the imaging is performed, the photoelectric conversion element 72 outputs the non-phase difference image data 73A by combining the pair of photodiodes PD1 and PD2 into one pixel. Further, in the AF mode, the photoelectric conversion element 72 outputs the phase difference image data 73B by detecting a signal from each of the pair of photodiodes PD1 and PD2.

That is, all the photosensitive pixels 72B, which are provided in the photoelectric conversion element 72 of the present embodiment, are so-called "phase difference pixels". The photosensitive pixel 72B can selectively output the non-phase difference image data 73A in which the photoelectric conversion is performed in the entire region of the pixel and the phase difference image data 73B in which the photoelectric conversion is performed in a part of the region of the pixel. Here, the "entire region of a pixel" is a light-receiving region in which the photodiode PD1 and the photodiode PD2 are combined to each other. Further, "a part of a region of a pixel" is a light-receiving region of the photodiode PD1 or a light-receiving region of the photodiode PD2.

The non-phase difference image data 73A can also be generated based on the phase difference image data 73B. For example, the non-phase difference image data 73A is generated by adding the phase difference image data 73B for each pair of pixel signals corresponding to the pair of photodiodes PD1 and PD2. Further, the phase difference image data 73B may include only data that is output from one of the pair of photodiodes PD1 or PD2. For example, in a case where the phase difference image data 73B includes only the data that is output from the photodiode PD1, it is possible to create data that is output from the photodiode PD2 by subtracting the phase difference image data 73B from the non-phase difference image data 73A for each pixel.

That is, the imaging data 73, which is read from the photoelectric conversion element 72, includes the non-phase difference image data 73A and/or the phase difference image data 73B. In the present embodiment, in the MF mode, the distance image data is generated by measuring the distance to the subject, which is present in the imaging area, based on the phase difference image data 73B. In the MF mode, the user can easily visually recognize the distance of the subject, which is an imaging target, by referring to the distance image. As a result, the user can easily adjust the focus with respect to the subject.

Figure 4:
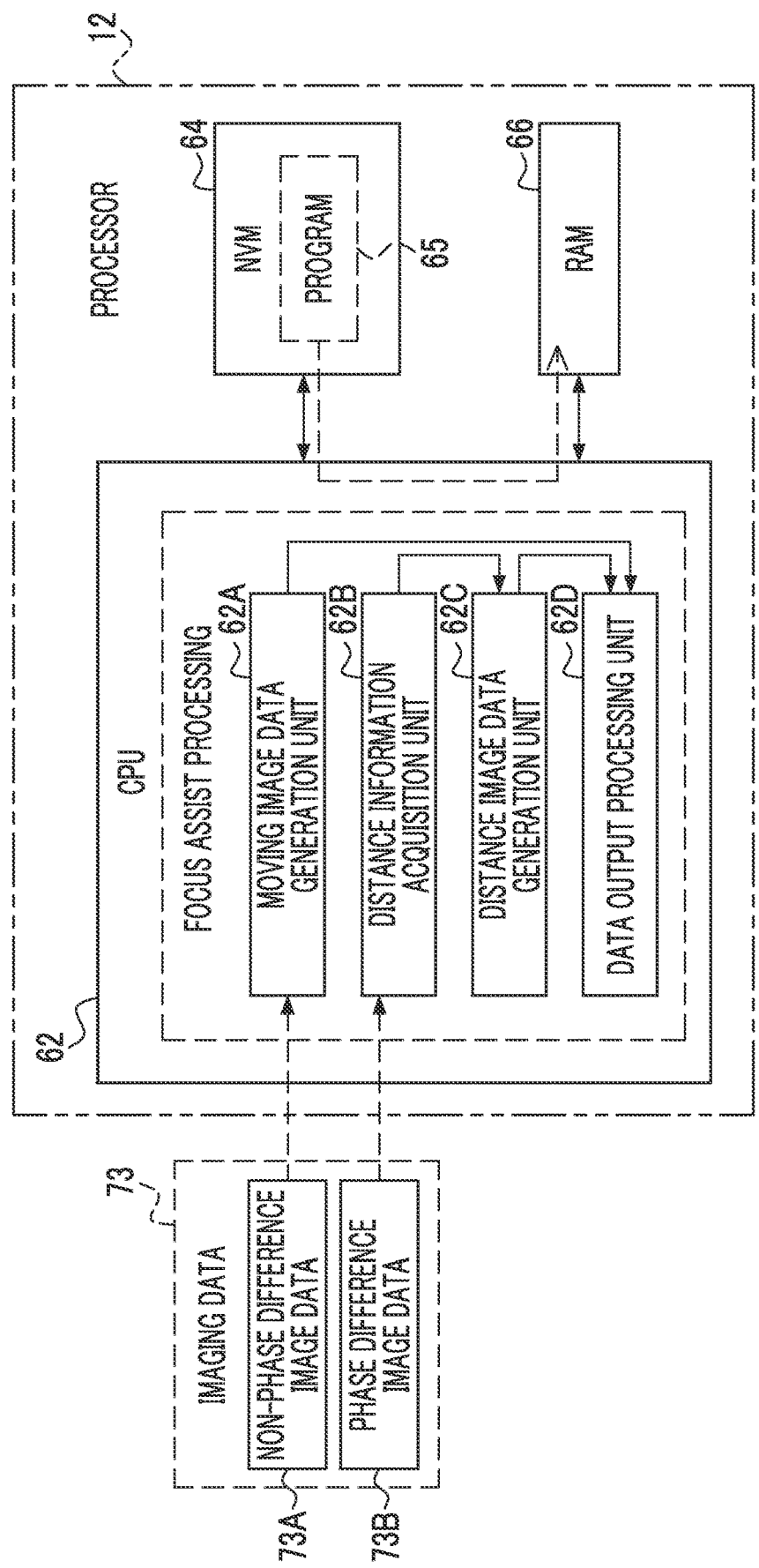
FIG. 4 is a block diagram showing an example of a function of a processor.

As an example shown in FIG. 4, the program 65 is stored in the NVM 64 of the imaging apparatus 10. The CPU 62 reads a program 65 from the NVM 64 and executes the read program 65 on the RAM 66. The CPU 62 performs focus assist processing according to the program 65 executed on the RAM 66. Distance information display processing is implemented by the CPU 62 operating as a moving image data generation unit 62A, a distance information acquisition unit 62B, a distance image data generation unit 62C, and a data output processing unit 62D according to the program 65.

Figure 5:
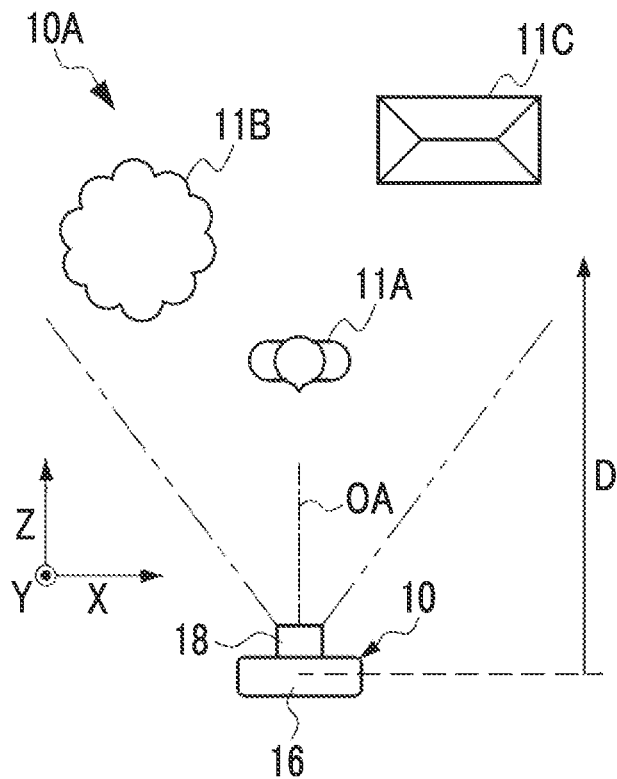
FIG. 5 is a bird's-eye view of an imaging area obtained by the imaging apparatus as viewed from above.

As an example shown in FIG. 5, the imaging is performed on the subject using the imaging apparatus 10. FIG. 5 is a bird's-eye view of the imaging area 10A obtained by the imaging apparatus 10 as viewed from above. In the example shown in FIG. 5, a person 11A, a tree 11B, and a building 11C are present as subjects in the imaging area 10A. In FIG. 5, a direction that is parallel to the optical axis OA is defined as the Z direction. The Z direction is orthogonal to the X direction and the Y direction described above. Further, D is defined as a distance from the imaging apparatus 10 in the Z direction. In the example shown in FIG. 5, among the person 11A, the tree 11B, and the building 11C, the distance D to the person 11A is the shortest, and the distance D to the building 11C is the longest.

Figure 6:
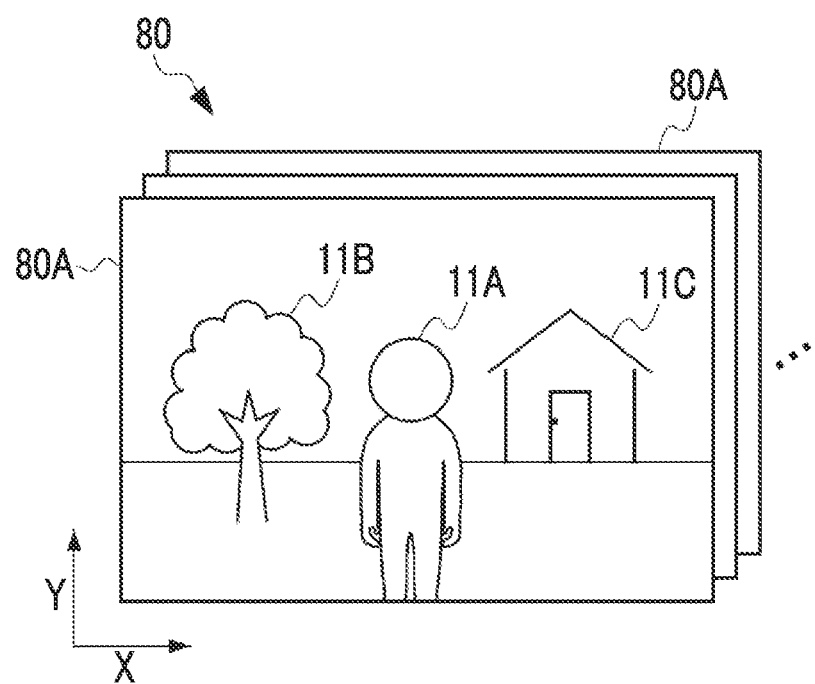
FIG. 6 is a diagram showing an example of moving image data.

As an example shown in FIG. 6, the moving image data generation unit 62A generates the moving image data 80 that includes a plurality of frames 80A, based on the non-phase difference image data 73A (see FIG. 4) obtained by the image sensor 20 performing an imaging operation. Each frame 80A of the moving image data 80 is two-dimensional data represented with a vertical axis and a horizontal axis. For example, the vertical axis is parallel to the Y direction and the horizontal axis is parallel to the X direction. In the example shown in FIG. 6, the person 11A, the tree 11B, and the building 11C are captured in each frame 80A.

The distance information acquisition unit 62B acquires information related to the distance (hereinafter, referred to as distance information) 84 (see FIG. 7) based on the phase difference image data 73B. That is, the distance information acquisition unit 62B acquires the distance information 84 based on the imaging data 73 in a case where the photosensitive pixel 72B (see FIG. 3) as the phase difference pixel outputs the phase difference image data 73B.

Specifically, the distance information acquisition unit 62B acquires distance information 84 at a plurality of positions within the imaging area 10A based on the phase difference image data 73B by detecting the phase difference (a deviation amount and a deviation direction) between an image, which is obtained based on a signal output from the photodiode PD1, and an image, which is obtained based on a signal output from the photodiode PD2. In the present embodiment, since the image plane phase difference type photoelectric conversion element 72 in which the pair of photodiodes is provided for one pixel is used, a distance D can be acquired for a position corresponding to each of the photosensitive pixels 72B. The distance information 84 represents a two-dimensional distribution of the distance D on the XY plane.

Figure 7:
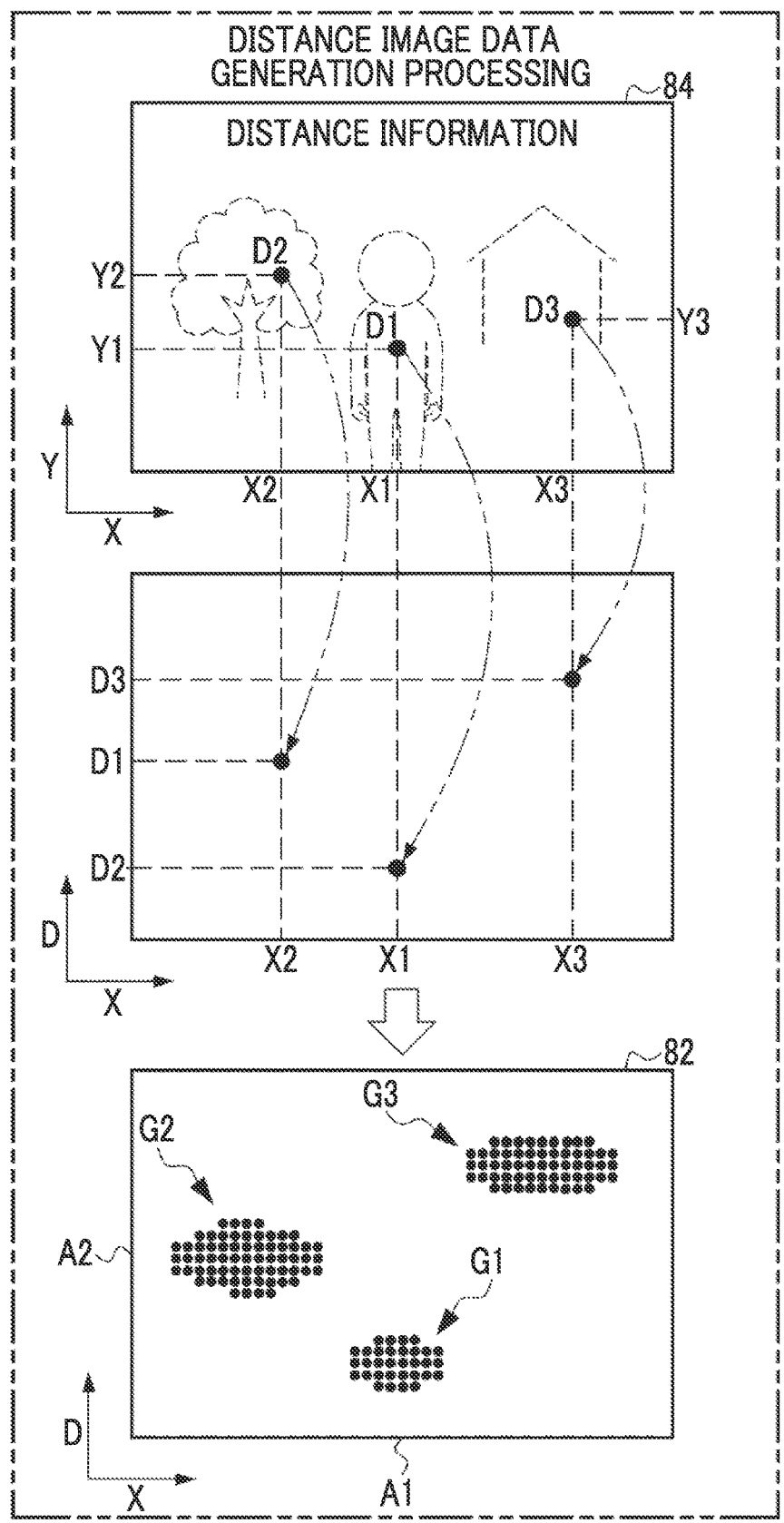
FIG. 7 is a conceptual diagram illustrating an example of distance image data generation processing.

As an example shown in FIG. 7, the distance image data generation unit 62C generates the distance image data 82 based on the distance information 84 that is acquired by the distance information acquisition unit 62B. In the distance image data 82, a first axis A1 corresponds to the vertical axis or the horizontal axis of the moving image data 80, and a second axis A2 represents the distance information 84. In the present embodiment, the first axis A1 of the distance image data 82 corresponds to the X axis (that is, the horizontal axis of the angle of view), and the second axis A2 represents the distance D. In the present embodiment, the first axis A1 and the second axis A2 are orthogonal to each other.

The distance image data generation unit 62C plots a point at a position (X1, D1) on a plane represented with the first axis A1 and the second axis A2 in a case where a distance of a position (X1, Y1) in the imaging area 10A is D1. The distance image data generation unit 62C generates the distance image data 82 by similarly plotting points at all the positions included in the distance information 84.

In the example shown in FIG. 7, the distance image data 82 includes a set G1 of points corresponding to the person 11A, a set G2 of points corresponding to the tree 11B, and a set G3 of points corresponding to the building 11C. The distances of the person 11A, the tree 11B, and the building 11C can be ascertained from positional relationships among the sets G1 to G3 in the second axis A2 direction. Although the ground is captured in FIG. 6, for the sake of brevity, the distance image data 82 shown in FIG. 7 reflects only the distance information of the person 11A, the tree 11B, and the building 11C. The same applies to the distance image data 82 shown in the other figures.

For example, each time the moving image data generation unit 62A generates one frame 80A, the distance image data generation unit 62C generates the distance image data 82 by using the distance information 84 corresponding to the generated frame 80A.

Figure 8:
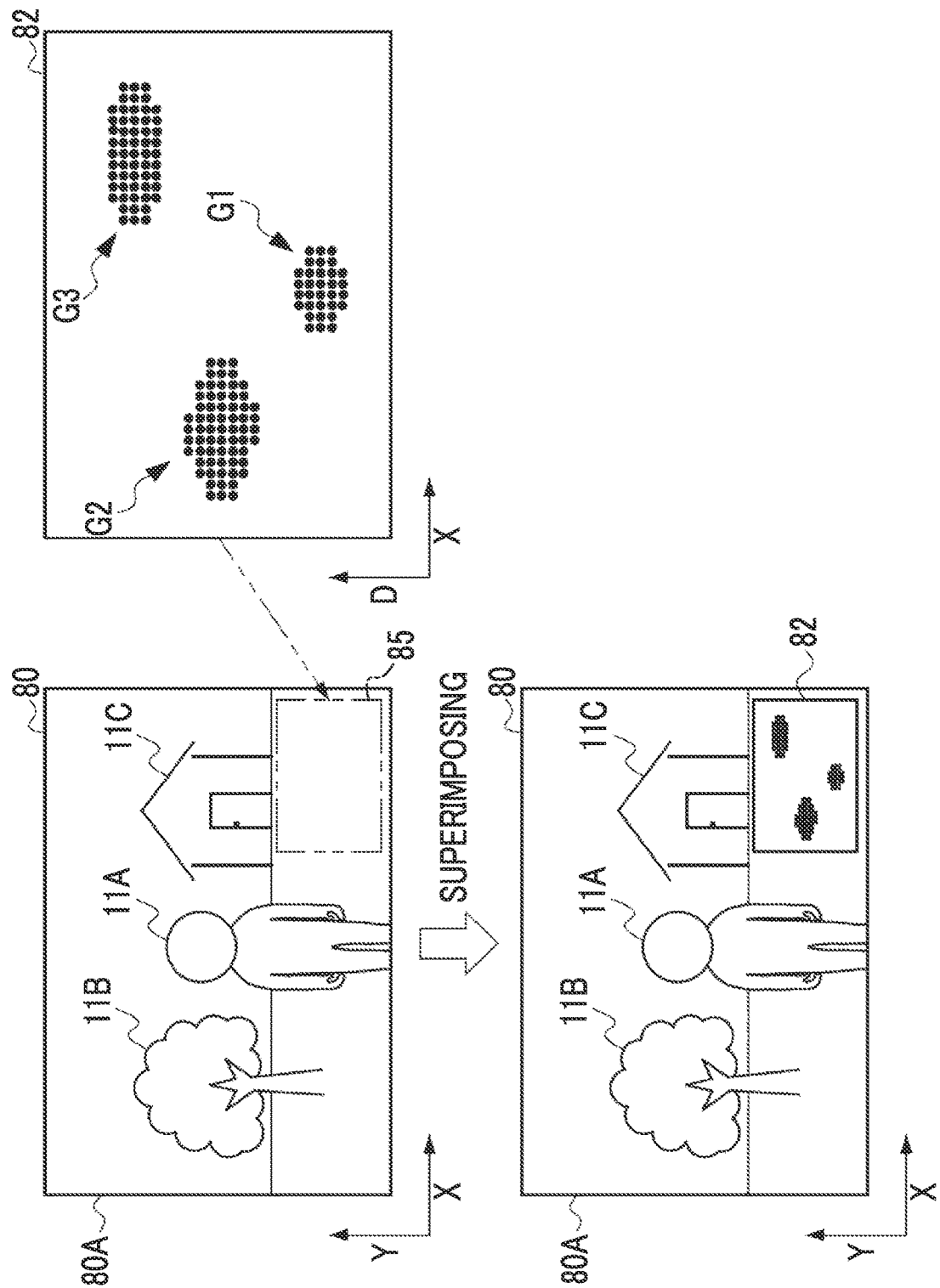
FIG. 8 is a conceptual diagram illustrating an example of data output processing.

As an example shown in FIG. 8, the data output processing unit 62D outputs the moving image data 80 and the distance image data 82 to the display 28 included in the touch panel display 32 in a state in which the distance image data 82 is superimposed on the frame 80A of the moving image data 80. Specifically, the data output processing unit 62D superimposes the distance image data 82 on a rectangular-shaped window region 85 set in the frame 80A. The data output processing unit 62D may combine the moving image data 80 and the distance image data 82 and output the combined data to the display 28 as one combined image.

The display 28 is an example of a "display destination" according to the present disclosed technology. Further, the data output processing unit 62D is not limited to directly outputting the moving image data 80 and the distance image data 82 to the display destination, and may indirectly output the data to the display destination via a relay apparatus or the like.

The moving image data 80 and the distance image data 82 are temporarily stored in the image memory 46 and then displayed on the display 28. The position and the size of the window region 85 in the frame 80A may be changed based on the operation of the reception device 76 by the user. Such a display aspect is called a picture-in-picture display (hereinafter, referred to as a PinP display). The user can easily visually recognize the distance of the subject by observing the distance image data 82 displayed in the moving image data 80.

Figure 9:
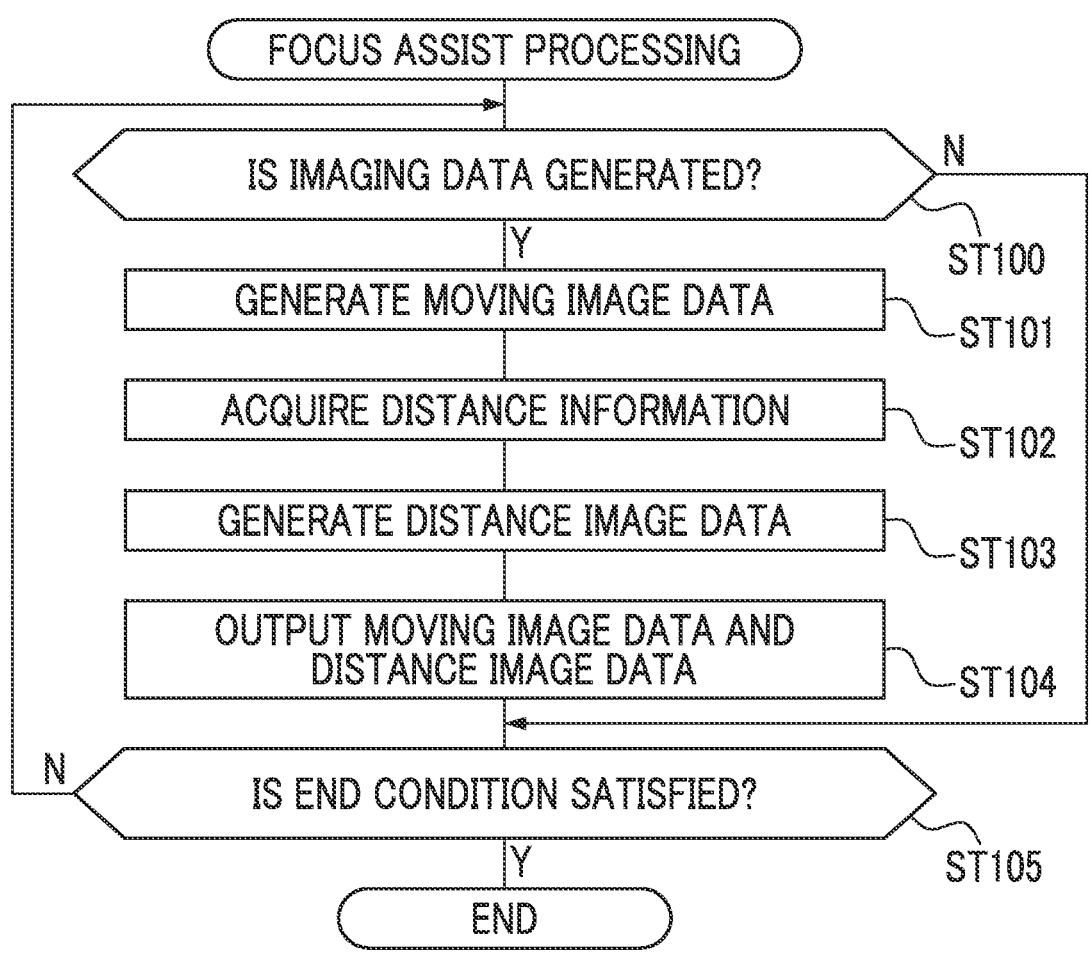
FIG. 9 is a flowchart showing an example of a flow of focus assist processing.

Next, the operation of the imaging apparatus 10 will be described with reference to FIG. 9. FIG. 9 shows an example of a flow of the focus assist processing executed by the CPU 62. The focus assist processing shown in FIG. 9 is executed, for example, during the display of the live view image before an imaging instruction is provided through the release button 22 in the MF mode.

In the focus assist processing shown in FIG. 9, first, in step ST100, the moving image data generation unit 62A determines whether or not the imaging data 73 (see FIG. 3) is generated by the image sensor 20 (see FIG. 2). Here, the imaging data 73 includes the non-phase difference image data 73A and the phase difference image data 73B.

In a case where the imaging data 73 is not generated by the image sensor 20 in step ST100, the determination is set as negative, and the focus assist processing shifts to step ST105. In a case where the imaging data 73 is generated by the image sensor 20 in step ST100, the determination is set as positive, and the focus assist processing shifts to step ST101.

In step ST101, the moving image data generation unit 62A generates the moving image data 80 (see FIG. 6) based on the non-phase difference image data 73A included in the imaging data 73. After one frame 80A of the moving image data 80 is generated in step ST101, the focus assist processing shifts to step ST102.

In step ST102, the distance information acquisition unit 62B acquires the distance information 84 (see FIG. 7) corresponding to the frame 80A generated in step ST101 based on the phase difference image data 73B included in the imaging data 73. After the processing in step ST102 is executed, the focus assist processing shifts to step ST103.

In step ST103, the distance image data generation unit 62C generates the distance image data 82 (see FIG. 7) based on the distance information 84 acquired in step ST102. After the processing in step ST103 is executed, the focus assist processing shifts to step ST104.

In step ST104, the data output processing unit 62D outputs the moving image data 80 and the distance image data 82 on the display 28 in a state in which the distance image data 82 is superimposed on the window region 85 set in the frame 80A (see FIG. 8). After the processing in step ST104 is executed, the focus assist processing shifts to step ST105.

In step ST105, the CPU 62 determines whether or not a condition (hereinafter, referred to as an "end condition") for ending the focus assist processing is satisfied. Examples of the end condition include a condition that it is detected that the imaging instruction has been given through the release button 22 (see FIG. 1). In step ST105, in a case where the end condition is not satisfied, the determination is set as negative, and the focus assist processing shifts to step ST100. In step ST105, in a case in which the end condition is satisfied, the determination is set as positive, and the focus assist processing is ended.

As described above, in the imaging apparatus 10, the user can easily visually recognize the distance of the subject by observing the distance image data 82 displayed in the moving image data 80. Further, the user can manually adjust the focus based on the distance of the recognized subject and then provide the imaging instruction.

In the above-described embodiment, the first axis A1 of the distance image data 82 corresponds to the X axis (that is, the horizontal axis of the angle of view) of the moving image data 80, and the second axis A2 represents the distance D. Instead, the first axis A1 of the distance image data 82 may correspond to the Y axis (that is, the vertical axis of the angle of view) of the moving image data 80, and the second axis A2 may represent the distance D.

Further, in the above-described embodiment, although the distance D is acquired for a position corresponding to each of the photosensitive pixels 72B included in the photoelectric conversion element 72, it is not necessary to acquire the distance D from the positions corresponding to all the photosensitive pixels 72B. That is, the photosensitive pixels 72B for acquiring the distance D may be thinned out.

Further, the above embodiment, although the photoelectric conversion element 72 is an image plane phase difference type photoelectric conversion element in which a pair of photodiodes is provided in one pixel and all the photosensitive pixels 72B have a function of outputting data related to imaging and phase difference, all the photosensitive pixels 72B are not limited to having the function of outputting data related to imaging and a phase difference. The photoelectric conversion element 72 may include a photosensitive pixel that does not have a function of outputting data related to the imaging and a phase difference. Further, the photoelectric conversion element 72 is not limited to an image plane phase difference type photoelectric conversion element in which a pair of photodiodes is provided in one pixel, the photoelectric conversion element 72 may include imaging photosensitive pixels for acquiring the non-phase difference image data 73A and phase difference detection photosensitive pixels for acquiring the phase difference image data 73B. In this case, the phase difference pixel is provided with a light shielding member so as to light-receive on one of the first pupil portion region and the second pupil portion region.

Further, in the above-described embodiment, although the distance information 84 is acquired by using the phase difference type photoelectric conversion element 72, the distance information 84 may be acquired by using a TOF type photoelectric conversion element without being limited to the phase difference type.

First Modification Example

The imaging apparatus 10 according to a first modification example makes it possible for the user to easily check, in addition to the distance of the subject, whether or not the subject, which is the imaging target, is within the depth of field.

Figure 10:
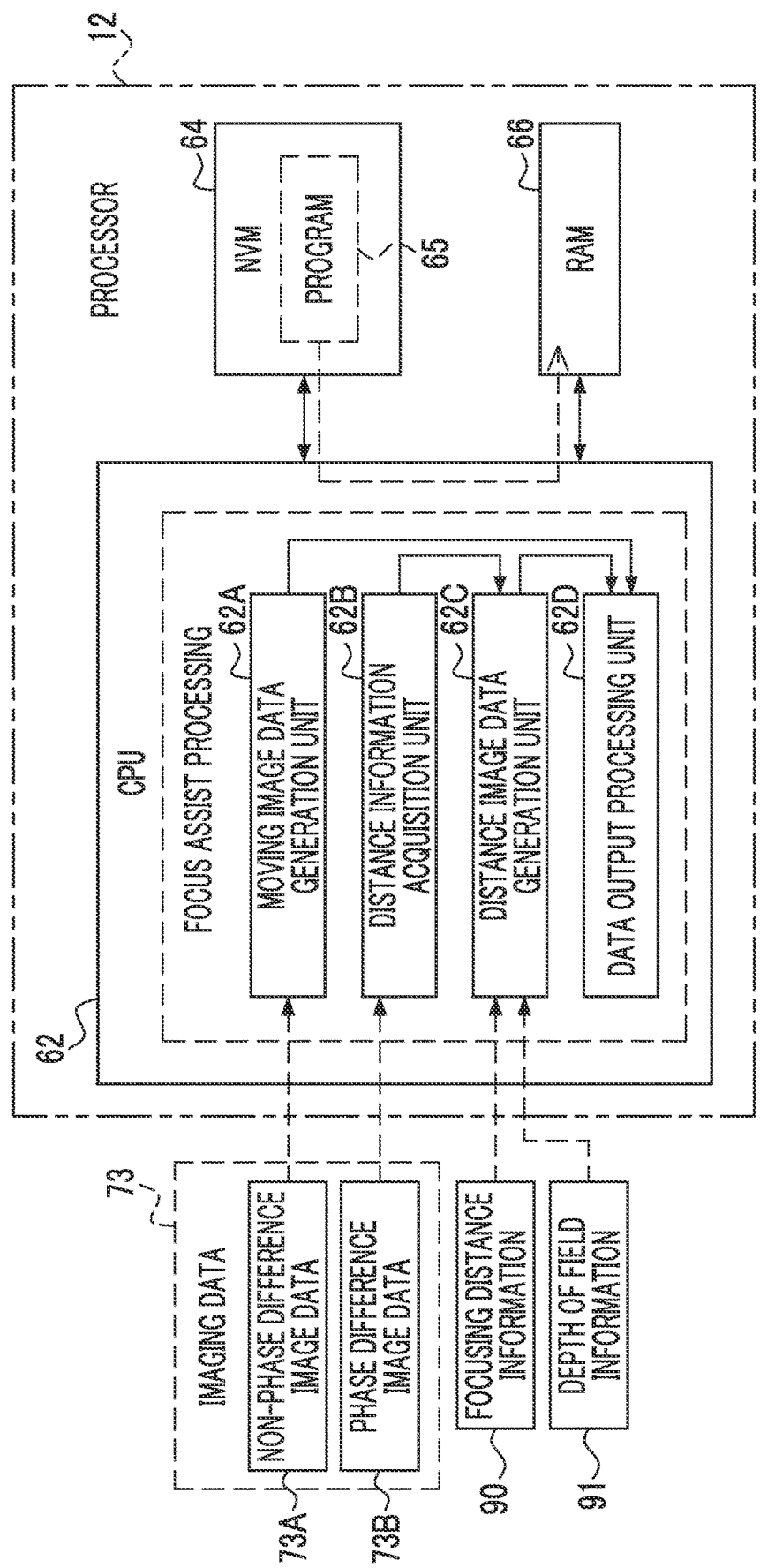
FIG. 10 is a block diagram showing an example of a function of a processor according to a first modification example.

As an example shown in FIG. 10, in the first modification example, in addition to acquiring the distance information 84 from the distance information acquisition unit 62B, the distance image data generation unit 62C acquires focusing distance information 90 and depth of field information 91 from the system controller 44, for example.

The focusing distance information 90 is information that represents a position (that is, a focusing distance) of the focus lens 40B. The depth of field information 91 is information that represents a rear side depth of field $L_r$ represented by Equation (1) and a front side depth of field $L_f$ represented by Equation (2).

$$L_r = \frac{\delta FL^2}{f^2 - \delta FL} \quad (1)$$

$$L_f = \frac{\delta FL^2}{f^2 + \delta FL} \quad (2)$$

Where, f is a focal length, F is a stop value (that is, an F number) of the stop 40D, L is a focusing distance, and δ is an allowable confusion circle diameter. The allowable confusion circle diameter is substantially twice an arrangement pitch of the photosensitive pixel 72B, and a blurriness of a size of substantially one pixel is allowed. The allowable confusion circle diameter may be changed by a user using the UI type device 48. The focusing distance L is a distance from the light-receiving surface 72A of the photoelectric conversion element 72 included in the image sensor 20 to the subject in the in-focus state.

For example, the depth of field information 91 includes values of the rear side depth of field $L_r$ and the front side depth of field $L_f$. The depth of field information 91 may include values of the focal length f, the stop value F, the focusing distance L, and the allowable confusion circle diameter δ, respectively. In this case, the distance image data generation unit 62C may calculate the rear side depth of field $L_r$ and the front side depth of field $L_f$ based on the above Equations (1) and (2).

Figure 11:
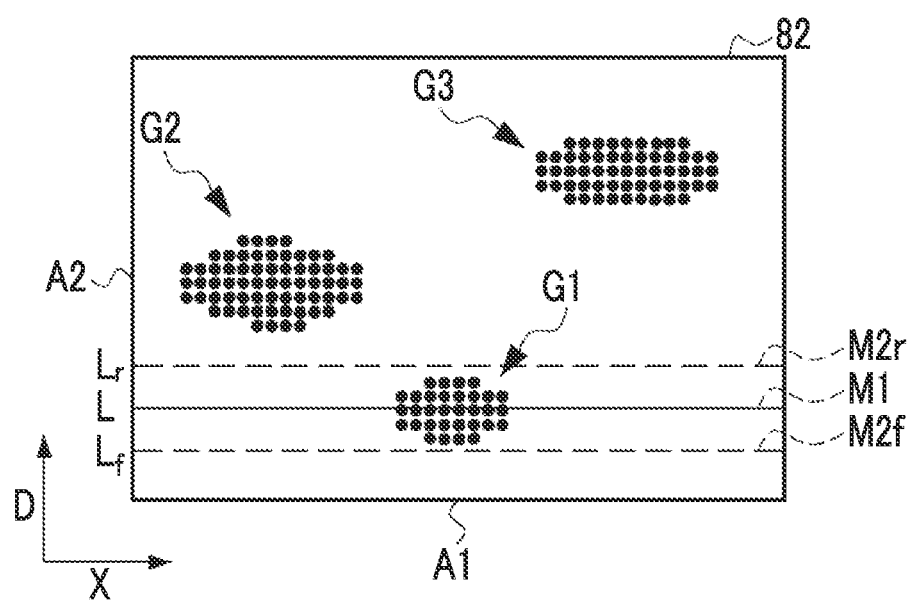
FIG. 11 is a diagram showing an example of distance image data according to the first modification example.

As an example shown in FIG. 11, in the present modification example, the distance image data generation unit 62C generates a linear-shaped first mark M1 indicating the focusing distance L based on the focusing distance information 90, and generates linear-shaped second marks M2r and M2f indicating the depth of field based on the depth of field information 91. The second mark M2r indicates a rear side depth of field $L_r$. The second mark M2f indicates a front side depth of field $L_f$. The distance image data generation unit 62C superimposes the first mark M1 and the second marks M2r and M2f on the distance image data 82 generated based on the distance information 84.

Figure 12:
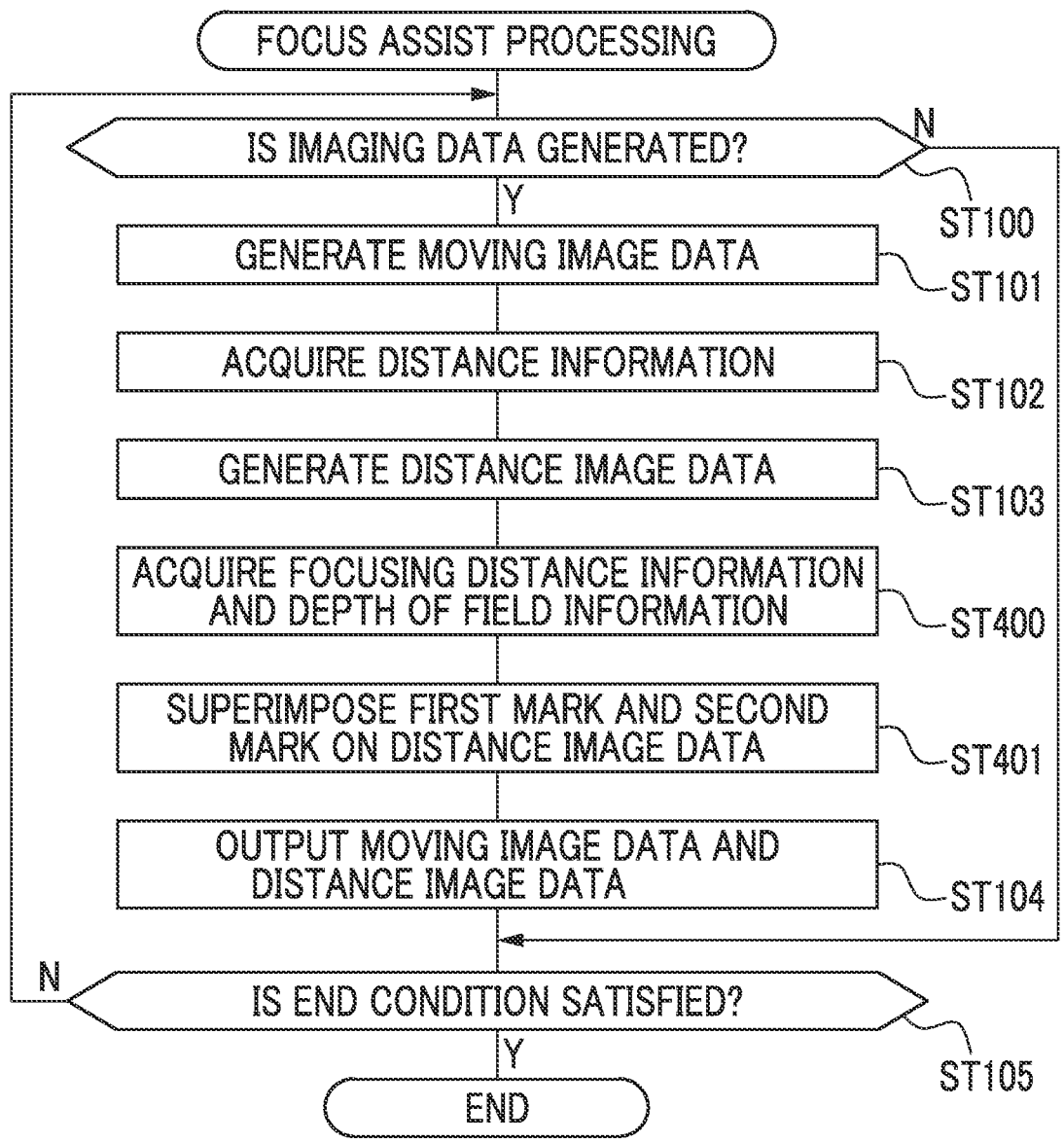
FIG. 12 is a flowchart showing an example of a flow of focus assist processing according to the first modification example.

As an example shown in FIG. 12, in the present modification example, in the focus assist processing shown in the above-described embodiment, after generating the distance image data 82 in step ST103, the distance image data generation unit 62C executes steps ST400 and ST401. In step ST400, the distance image data generation unit 62C acquires the focusing distance information 90 and the depth of field information 91 from the system controller 44. In step ST401, the distance image data generation unit 62C generates the first mark M1 and the second marks M2r and M2f based on the focusing distance information 90 and the depth of field information 91, and superimposes the generated first mark M1 and second marks M2r and M2f on the distance image data 82.

In the present modification example, after step ST401, in step ST104, the data output processing unit 62D outputs the moving image data 80 and the distance image data 82, which includes the first mark M1 and the second marks M2r and M2f, on the display 28 included in touch panel display 32.

Since the other steps shown in FIG. 12 are the same as the steps shown in FIG. 9 described in the above-described embodiment, the description thereof will be omitted.

According to the present modification example, the user can easily visually determine whether or not the subject, which is the imaging target, is within the depth of field. In the example shown in FIG. 11, the set G1 is located between the second mark M2r and the second mark M2f and is present on the first mark M1. Therefore, the user can easily visually check that the person 11A (see FIG. 8) is within the depth of field and is in focus.

In the present modification example, although the distance image data 82 includes information representing the first mark M1 and the second marks M2r and M2f, the distance image data 82 may include information representing at least one of the first mark M1 or the second marks M2r and M2f.

Second Modification Example

In the imaging apparatus 10 according to a second modification example, the user can change the focusing distance and/or the depth of field by operating the distance image data 82 that is displayed on the touch panel display 32.

Figure 13:
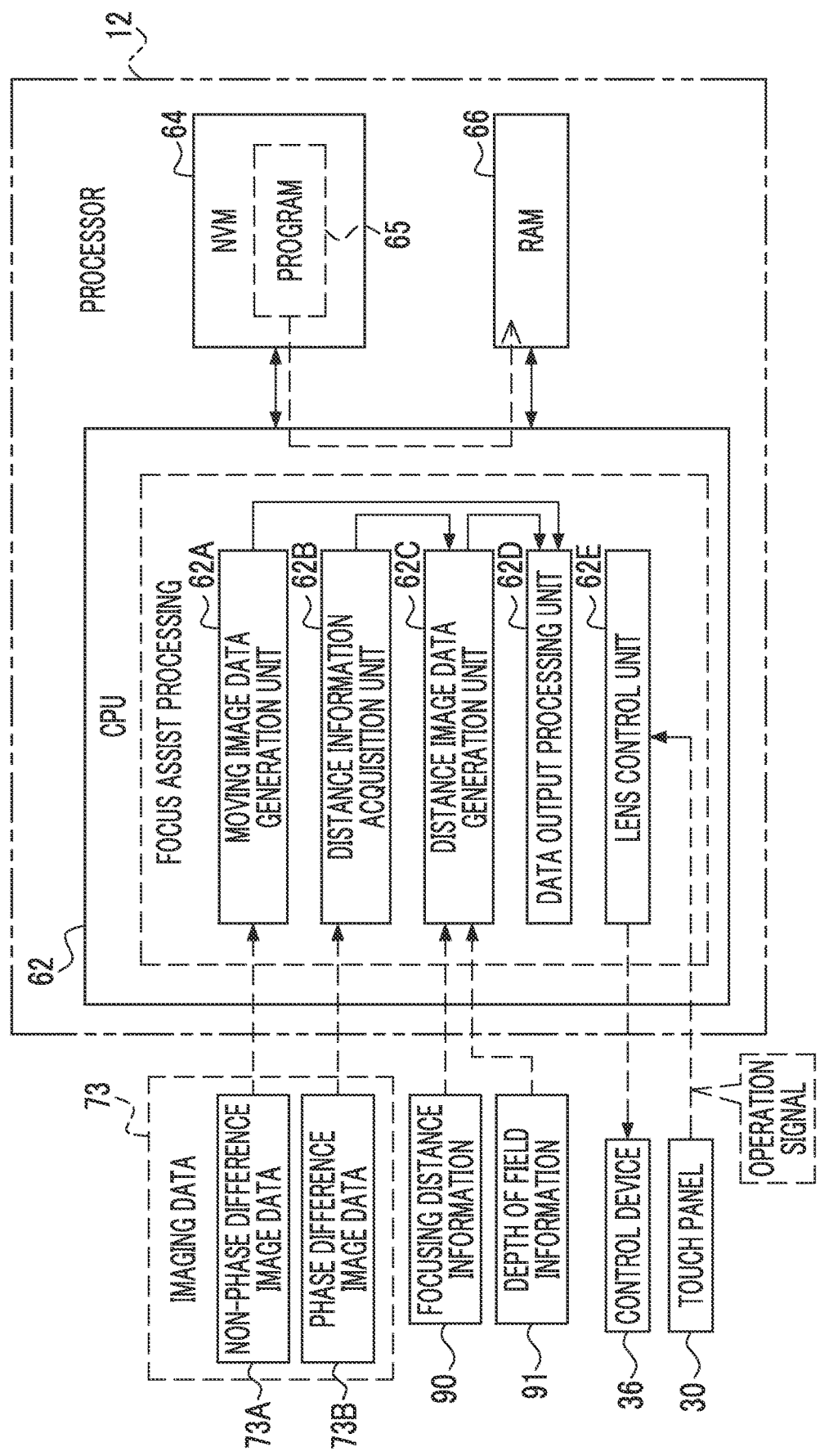
FIG. 13 is a block diagram showing an example of a function of a processor according to a second modification example.

As an example shown in FIG. 13, in the second modification example, the CPU 62 implements a lens control unit 62E in addition to the moving image data generation unit 62A, the distance information acquisition unit 62B, the distance image data generation unit 62C, and the data output processing unit 62D. Similarly to the first modification example, the distance image data generation unit 62C according to the second modification example generates the first mark M1 and the second marks M2r and M2f based on the focusing distance information 90 and the depth of field information 91, and superimposes the generated first mark M1 and second marks M2r and M2f on the distance image data 82.

The lens control unit 62E controls the focus lens 40B and/or the stop 40D by providing an instruction to the control device 36 of the interchangeable lens 18, based on an operation signal output from the touch panel 30 included in the touch panel display 32 (see FIG. 1). In the present modification example, the user can perform an operation of changing the positions of the first mark M1 or the second marks M2r and M2f along the second axis A2 in the distance image data 82 displayed on the touch panel display 32.

Figure 14:
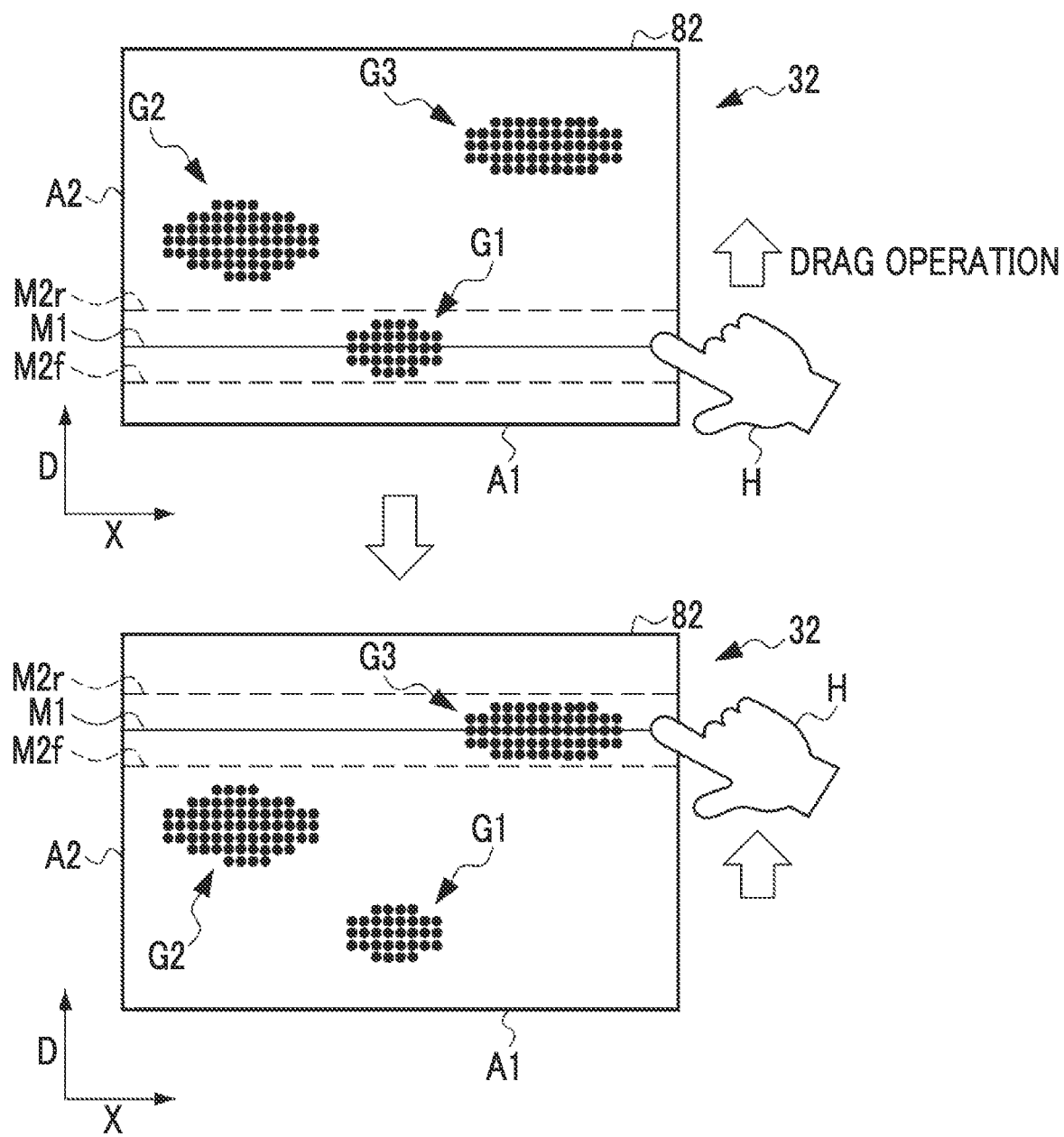
FIG. 14 is a diagram showing an example of a change operation of a focusing distance according to the second modification example.

As an example shown in FIG. 14, in the distance image data 82 displayed on the touch panel display 32, the user can change the position of the first mark M1 by performing a drag operation along the second axis A2 while touching the first mark M1 with the finger of the hand H.

The lens control unit 62E performs control of moving the focus lens 40B based on an operation signal output from the touch panel 30 in a case where the reception device 76 (see FIG. 2) receives an operation of changing the position of the first mark M1 along the second axis A2. Specifically, the lens control unit 62E performs control of changing the position of the focus lens 40B such that the distance D indicated by the changed first mark M1 becomes the focusing distance L.

The second marks M2r and M2f move in association with the movement of the first mark M1. This is because the rear side depth of field $L_r$ and the front side depth of field $L_f$ indicated by the second marks M2r and M2f depend on the focusing distance L indicated by the first mark M1 (see Equation (1) and Equation (2)).

In the example shown in FIG. 14, the example is shown in which the user performs the drag operation on the first mark M1 such that the building 11C behind the person 11A is in focus from a state in which the person 11A is in focus.

Figure 15:
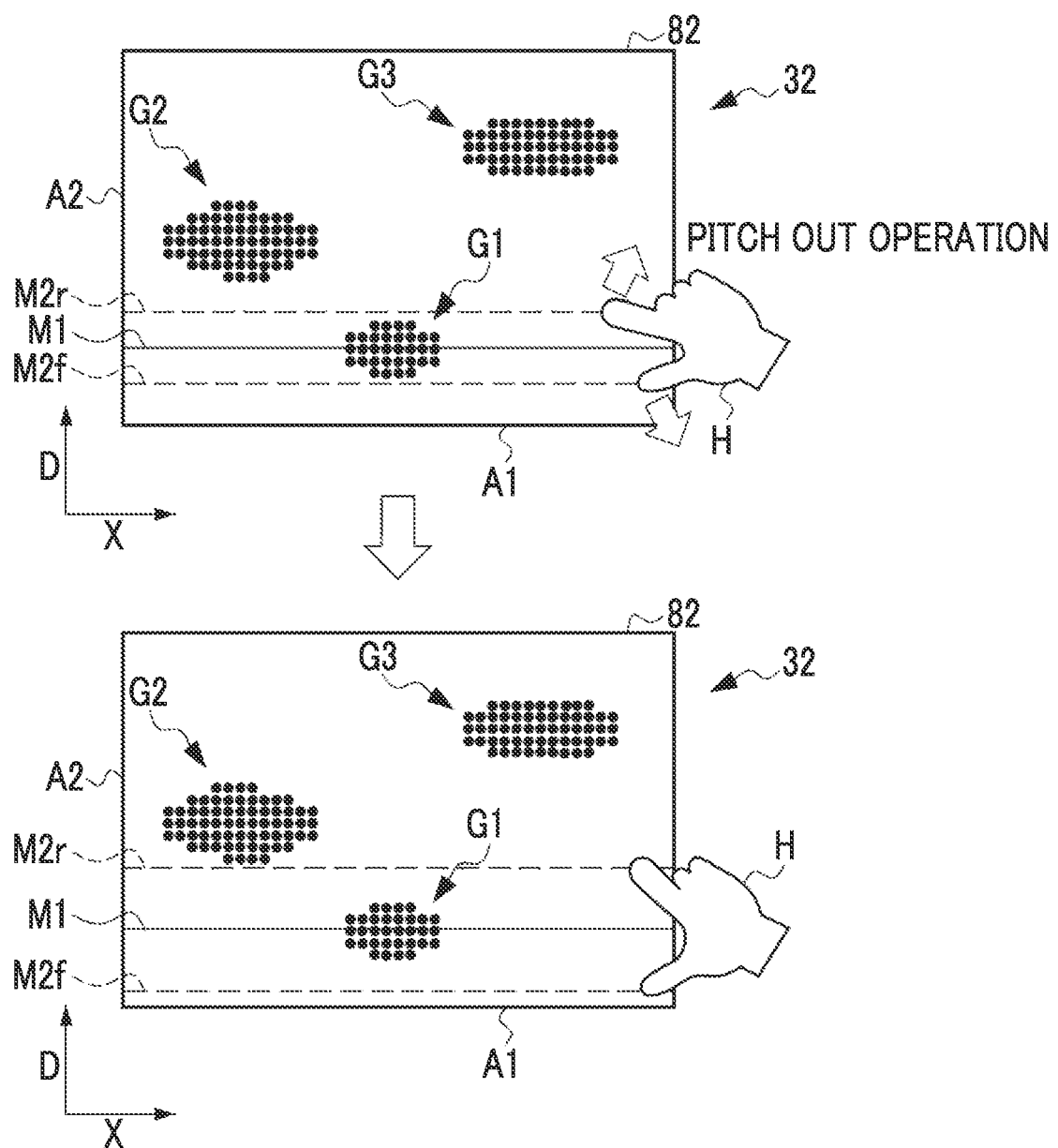
FIG. 15 is a diagram showing an example of a change operation of a depth of field according to the second modification example.

As an example, as shown in FIG. 15, in the distance image data 82 displayed on the touch panel display 32, the user can widen the interval between the second marks M2r and M2f by performing a pinch out operation while touching the second marks M2r and M2f with the fingers of the hand H. By widening the interval between the second marks M2r and M2f, the positions of the second marks M2r and M2f are each changed.

The lens control unit 62E performs control of changing the stop value (F number) of the stop 40D based on the operation signal output from the touch panel 30 in a case where the touch panel 30 receives the operation of changing the positions of the second marks M2r and M2f along the second axis A2. Specifically, the lens control unit 62E performs the control of changing the stop value based on Equations (1) and (2) such that the rear side depth of field $L_r$ and the front side depth of field $L_f$ indicated with the second marks M2r and M2f are obtained.

The operation is not limited to the pinch out operation, and the user can change the interval between the second marks M2r and M2f by performing the drag operation with respect to one of the second marks M2r and M2f along the second axis A2.

Figure 16:
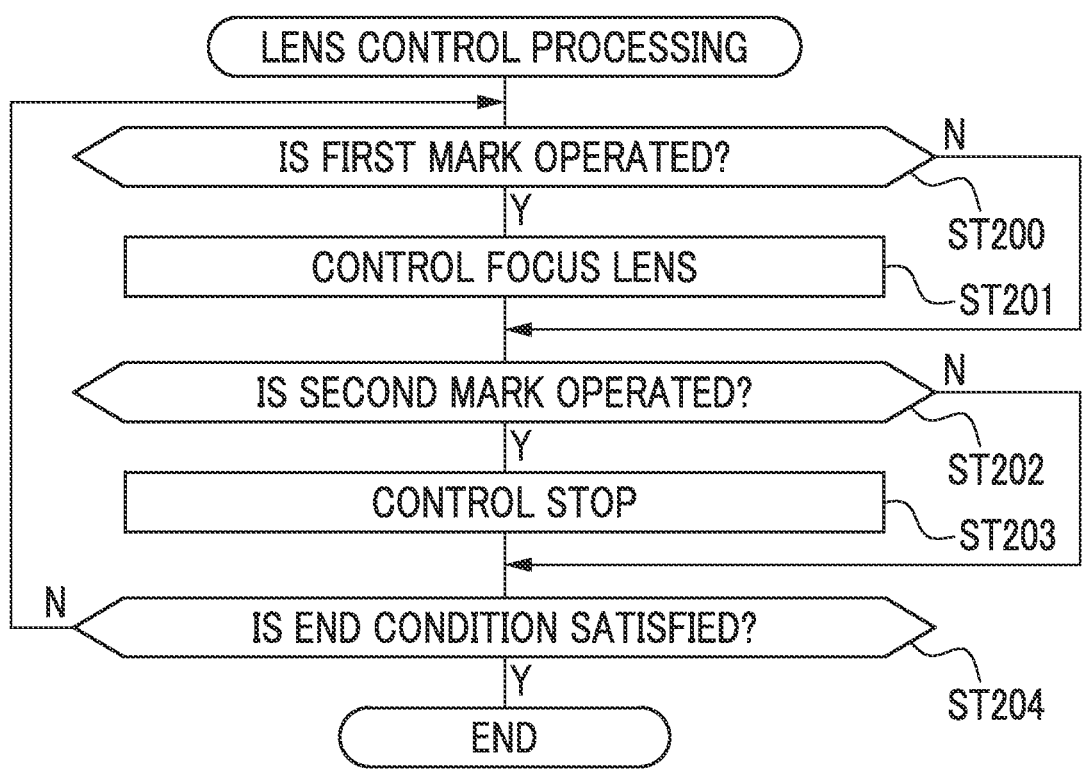
FIG. 16 is a flowchart showing an example of a flow of lens control processing according to the second modification example.

Next, an example of the lens control processing will be described with reference to FIG. 16. FIG. 16 shows an example of a flow of the lens control processing executed by the CPU 62. The lens control processing shown in FIG. 16 is executed, for example, during the display of the live view image before an imaging instruction is provided through the release button 22 in the MF mode.

In the lens control processing shown in FIG. 16, first, in step ST200, the lens control unit 62E determines whether or not the first mark M1 is operated.

In step ST200, in a case where the first mark M1 is not operated, the determination is set as negative, and the lens control processing shifts to step ST202. In step ST200, in a case where the first mark M1 is operated, the determination is set as positive, and the lens control processing shifts to step ST201.

In step ST201, the lens control unit 62E controls the focus lens 40B such that the distance D, which is indicated by the first mark M1 changed by the operation, becomes the focusing distance L. After the control of the focus lens 40B is performed in step ST201, the lens control processing shifts to step ST202.

In step ST202, the lens control unit 62E determines whether or not the second marks M2r and M2f are operated.

In step ST202, in a case where the second marks M2r and M2f are not operated, the determination is set as negative, and the lens control processing shifts to step ST204. In step ST202, in a case where the second marks M2r and M2f are operated, the determination is set as positive, and the lens control processing shifts to step ST203.

In step ST203, the lens control unit 62E controls the stop 40D such that the rear side depth of field $L_r$ and the front side depth of field $L_f$, which are indicated by the second marks M2r and M2f changed by the operation, are obtained. After the control of the stop 40D is performed in step ST203, the lens control processing shifts to step ST204.

In step ST204, the CPU 62 determines whether or not a condition (hereinafter, referred to as an "end condition") for ending the lens control processing is satisfied. Examples of the end condition include a condition that it is detected that the imaging instruction has been given through the release button 22 (see FIG. 1). In step ST204, in a case in which the end condition is not satisfied, the determination is set as negative, and the lens control processing shifts to step ST200. In step ST204, in a case where the end condition is satisfied, the determination is set as positive, and the lens control processing is ended.

As described above, in the imaging apparatus 10 according to the present modification example, the first mark M1 or the second marks M2r and M2f can be changed by performing an operation on the distance image data 82. Accordingly, the user can intuitively perform the manual focusing and/or the adjustment of the stop value.

In the present modification example, although the positions of the first mark M1 or the second marks M2r and M2f can be changed by operating the touch panel 30, the operation is not limited to the touch panel 30, and the change may be possible by operating a member such as the hard key unit 78.

Third Modification Example

The imaging apparatus 10 according to a third modification example is different from the imaging apparatus 10 according to the second modification example in that a changeable range of the first mark M1 or the second marks M2r and M2f is limited based on the distance of a specific subject.

Figure 17:
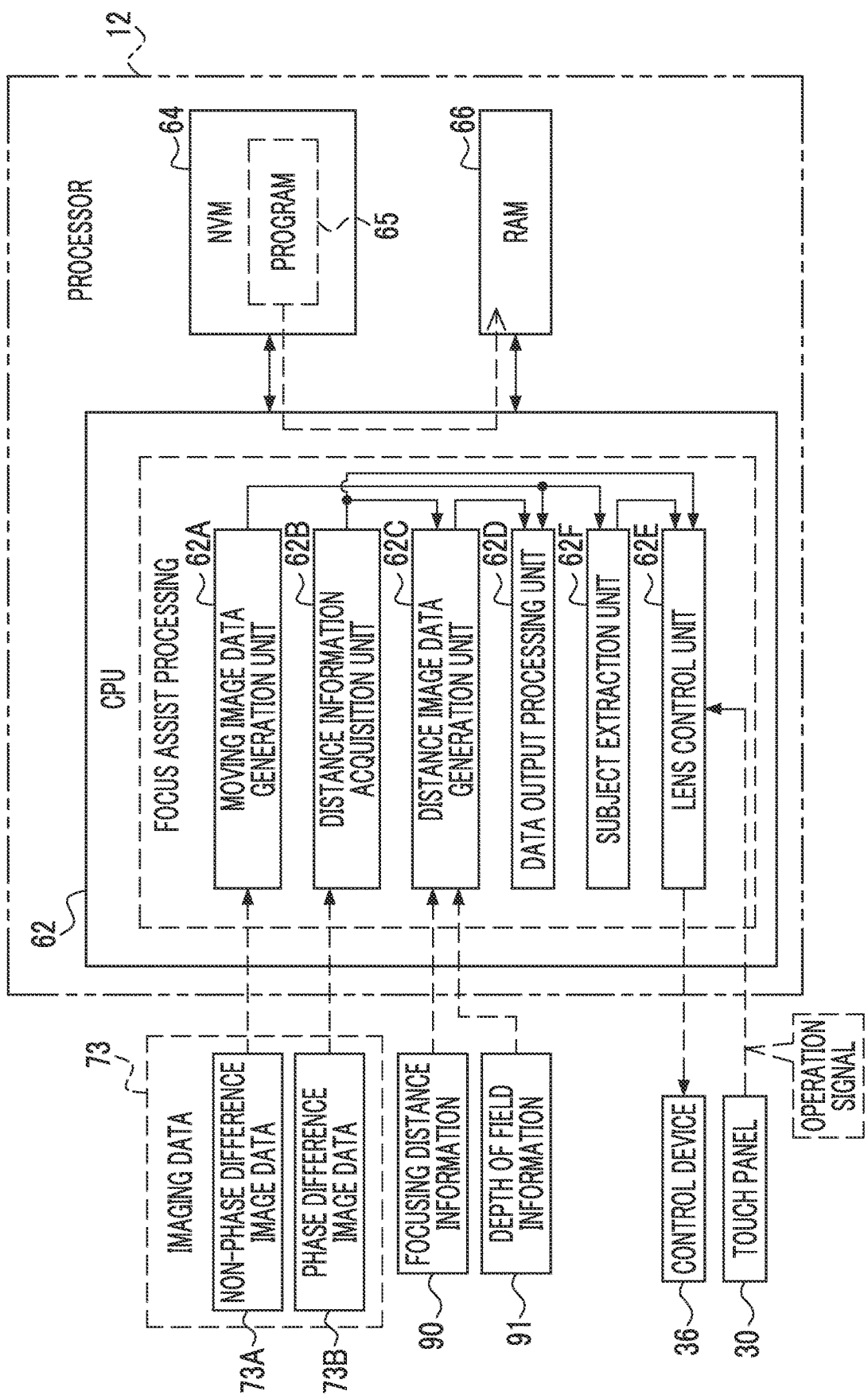
FIG. 17 is a block diagram showing an example of a function of a processor according to a third modification example.

As an example shown in FIG. 17, in the third modification example, the CPU 62 implements a subject extraction unit 62F in addition to the moving image data generation unit 62A, the distance information acquisition unit 62B, the distance image data generation unit 62C, the data output processing unit 62D and the lens control unit 62E. The subject extraction unit 62F extracts a main subject from each frame 80A of the moving image data 80. For example, the subject extraction unit 62F extracts the person 11A as the main subject from each frame 80A by using a known method such as face detection or subject detection. It should be noted that the main subject is an example of a "target subject" according to the present disclosed technology.

Figure 18:
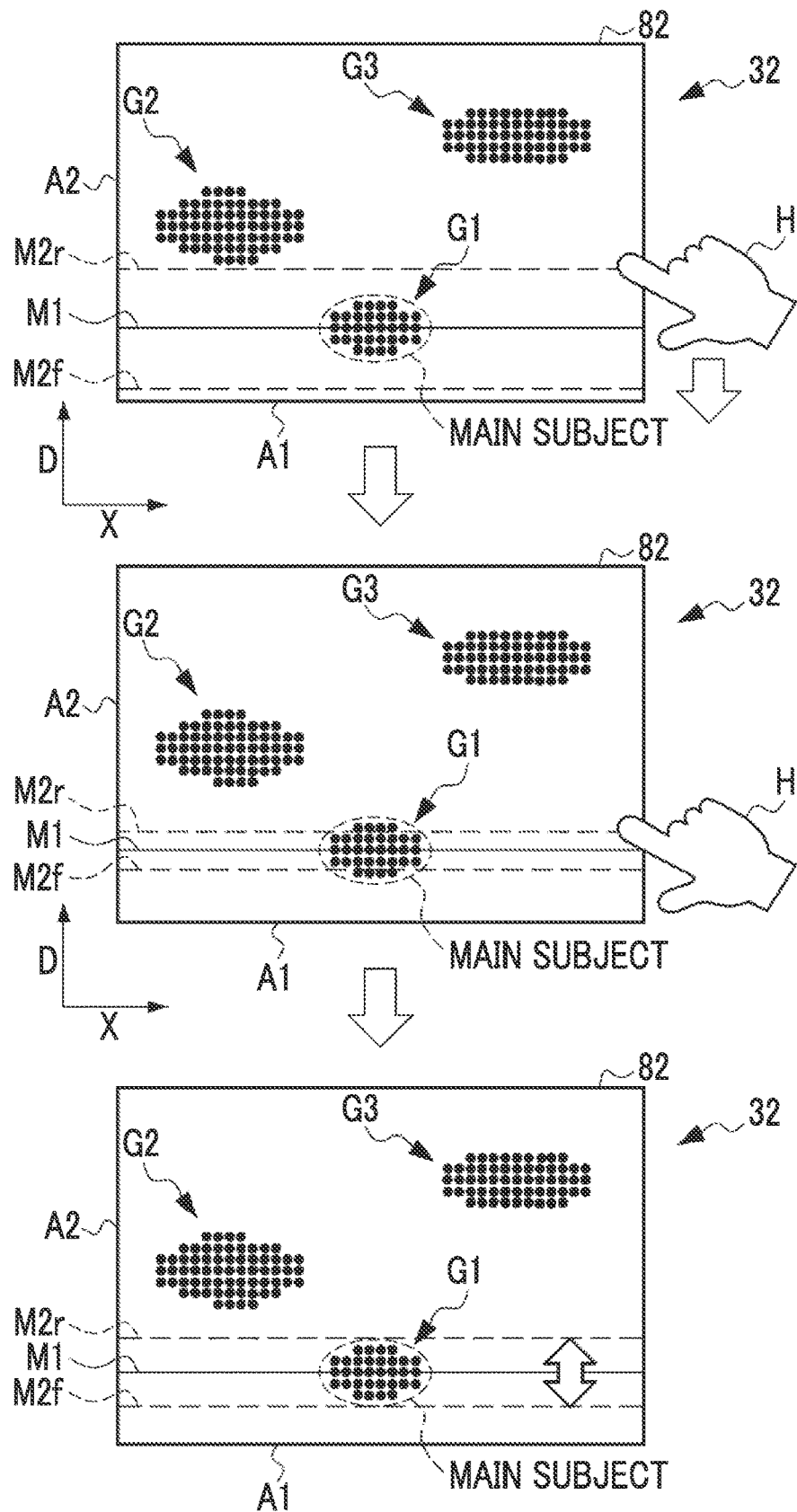
FIG. 18 is a diagram showing an example of a change operation of a depth of field according to the third modification example.

In the present modification example, the lens control unit 62E controls the focus lens 40B and/or the stop 40D with a range in which the main subject is within the depth of field (that is, between the second marks M2r and M2f). As an example, FIG. 18 shows an attempt to narrow the depth of field below the distance range of the main subject by the user performing the drag operation on the second mark M2r in a state in which the main subject is included in the depth of field. In this case, the lens control unit 62E performs control of reducing the F number of the stop 40D and restricts the change of the F number (that is, restricts the change of the depth of field) so as to satisfy the range in which the main subject is within the depth of field.

Similarly, in a case where the positions of the second marks M2r and M2f are changed in accordance with the operation of the first mark M1, the lens control unit 62E restricts the change of the focusing distance so as to satisfy the range in which the main subject is within the depth of field.

In the present modification example, since the change of the depth of field and the focusing distance is restricted so as to satisfy the range in which the main subject is within the depth of field, the user can appropriately keep the main subject within the depth of field with the intuitive operation.

Further, in the present modification example, since the lens control unit 62E extracts the main subject based on the moving image data 80, the focus lens 40B and/or the stop 40D are controlled at the range in which the main subject is within the depth of field even in a case where the distance to the main subject is changed. Therefore, in the present modification example, the depth of field can be made to follow the main subject.

Further, in the present modification example, although the subject extraction unit 62F extracts the main subject based on the moving image data 80, the subject extraction unit 62F may extract the subject, which is specified by the user using the touch panel 30 or the like, as the main subject. For example, in a case where an operation of designating a region with respect to the moving image data 80 displayed on the touch panel display 32 is performed, the subject extraction unit 62F extracts a designated region, which is designated with respect to the moving image data 80, as the main subject. In this case, the lens control unit 62E controls the focus lens 40B and/or the stop 40D such that the main subject, which is designated by the user, is within the depth of field.

Fourth Modification Example

The imaging apparatus 10 according to a fourth modification example enables a part of the distance image data 82 to be enlarged and displayed by the user performing the operation with respect to the distance image data 82 that is displayed on the touch panel display 32. In the present modification example, the distance image data generation unit 62C enlarges a part of the distance image data 82 in the second axis A2 direction based on the operation signal that is output from the touch panel 30 or the like.

Figure 19:
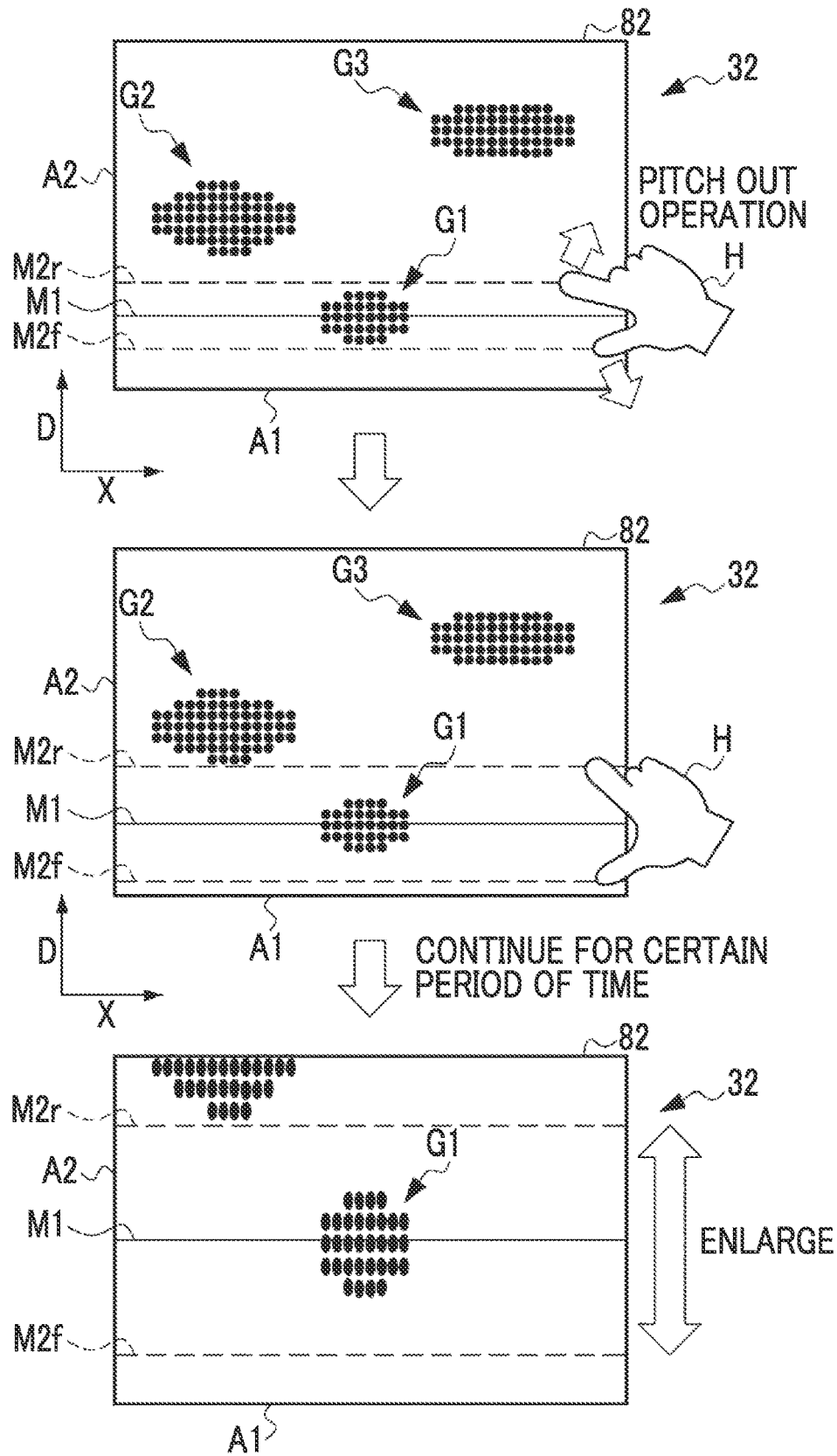
FIG. 19 is a diagram showing an example of a change operation of a depth of field according to a fourth modification example.

As an example shown in FIG. 19, the distance image data generation unit 62C performs processing of enlarging the region, which includes the second marks M2r and M2f, in the second axis A2 direction in a case where the user performs the pinch out operation to widen the interval between the second marks M2r and M2f. More specifically, the distance image data generation unit 62C performs the processing of enlarging the region, which includes the second marks M2r and M2f, in the second axis A2 direction in a case where a state in which an operation speed of the pinch out operation is equal to or lower than a certain speed continues for a certain period of time.

Figure 20:
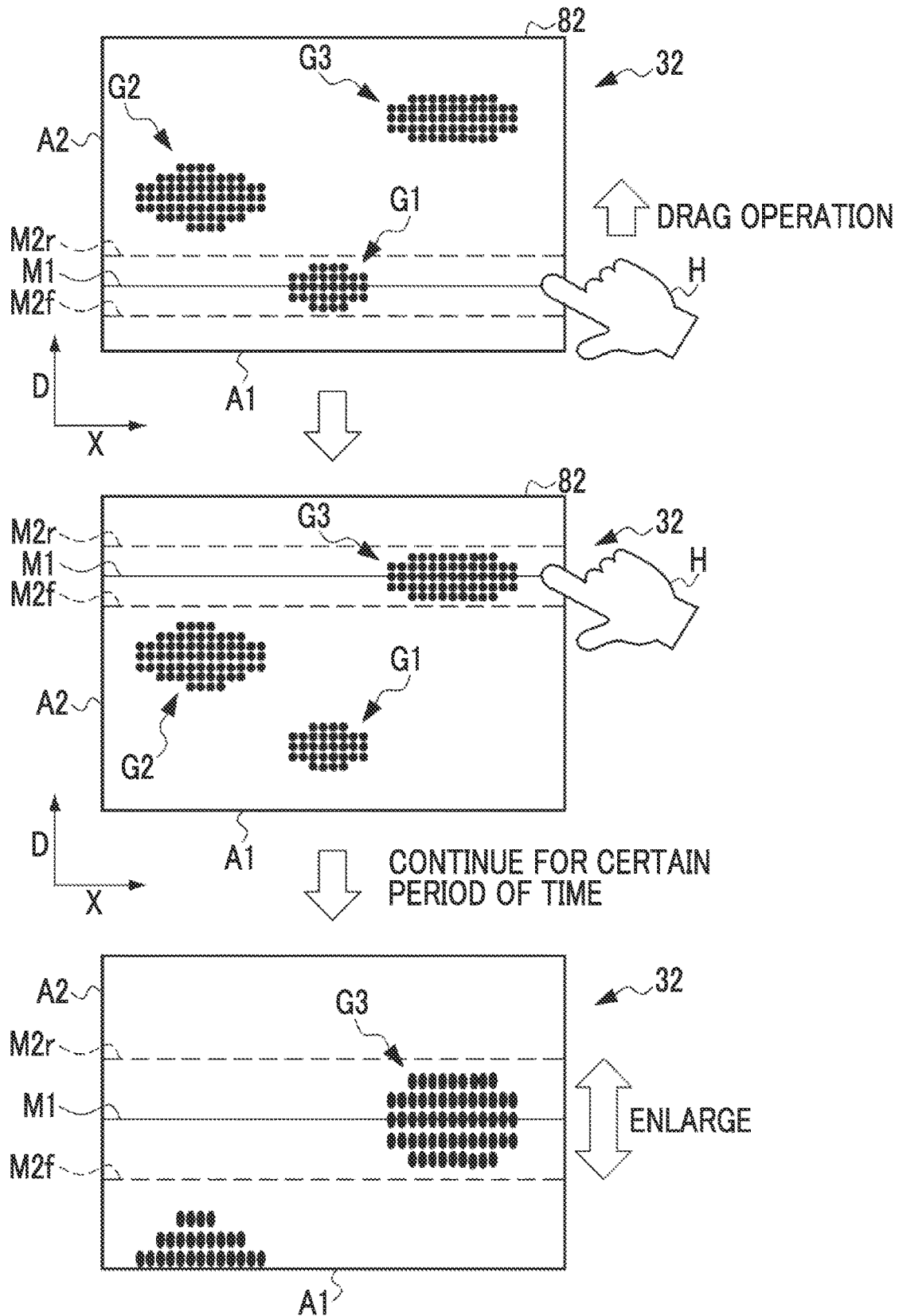
FIG. 20 is a diagram showing an example of a change operation of a focusing distance according to the fourth modification example.

Further, as an example shown in FIG. 20, the distance image data generation unit 62C performs the processing of enlarging the region, which includes the second marks M2r and M2f, around the first mark M1 in the second axis A2 direction in a case where the user performs the drag operation on the first mark M1 and the state in which an operation speed of the drag operation is equal to or lower than a certain speed continues for a certain period of time.

Figure 21:
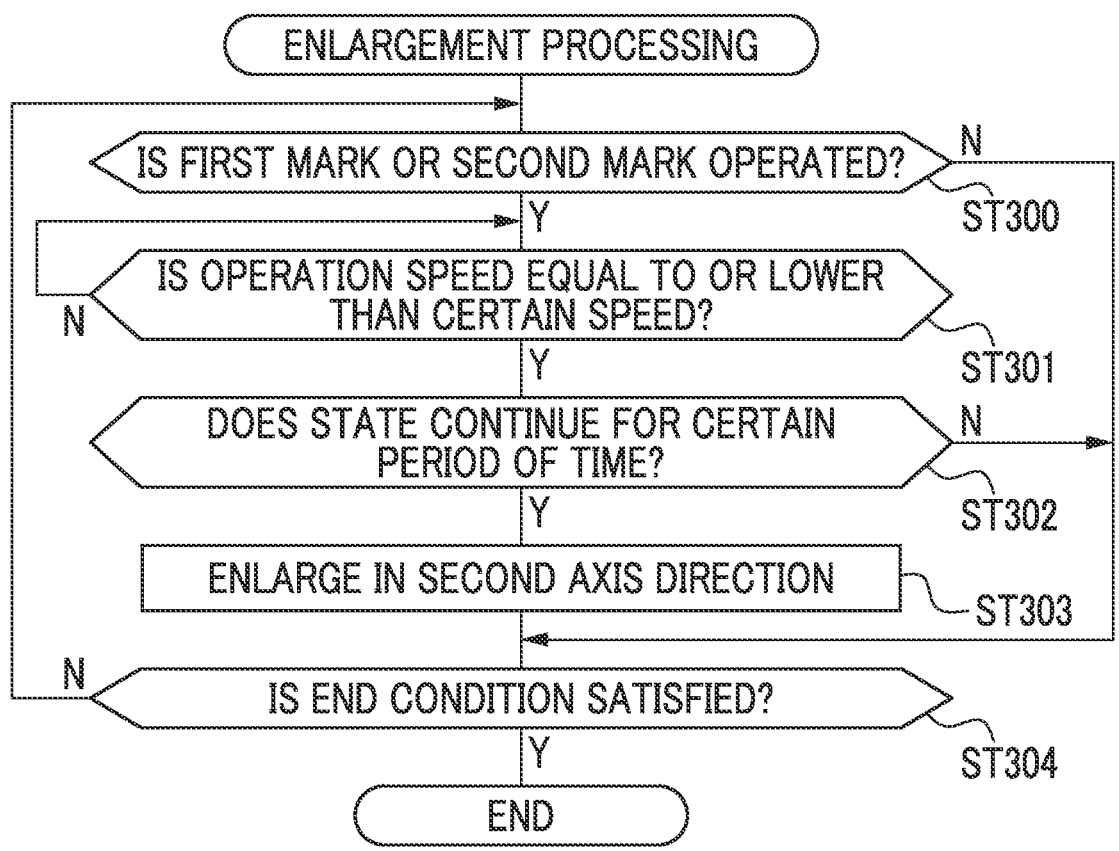
FIG. 21 is a flowchart showing an example of a flow of enlargement processing according to the fourth modification example.

Next, an example of the enlargement processing will be described with reference to FIG. 21. FIG. 21 shows an example of a flow of the enlargement processing executed by the CPU 62. The enlargement processing shown in FIG. 21 is executed, for example, during the display of the live view image before an imaging instruction is provided through the release button 22 in the MF mode.

In the lens control processing shown in FIG. 21, first, in step ST300, the distance image data generation unit 62C determines whether or not the first mark M1 or the second marks M2r and M2f are operated.

In step ST300, in a case where the first mark M1 and the second marks M2r and M2f are not operated, the determination is set as negative, and the enlargement processing shifts to step ST304. In step ST300, in a case where the first mark M1 or the second marks M2r and M2f are operated, the determination is set as positive, and the enlargement processing shifts to step ST301.

In step ST301, the distance image data generation unit 62C determines whether or not the operation speed is equal to or lower than a certain speed. In step ST301, in a case where the operation speed is not equal to or lower than a certain speed, the determination is set as negative, and the enlargement processing executes step ST301 again. In step ST301, in a case where the operation speed is equal to or lower than a certain speed, the determination is set as positive, and the enlargement processing shifts to step ST302.

In step ST302, the distance image data generation unit 62C determines whether or not the state in which the operation speed is equal to or lower than a certain speed continues for a certain period of time. In step ST302, in a case where the state in which the operation speed is equal to or lower than a certain speed does not continue for a certain period of time, the determination is set as negative, and the enlargement processing shifts to step ST304. In step ST302, in a case where the state in which the operation speed is equal to or lower than a certain speed continues for a certain period of time, the determination is set as positive, and the enlargement processing shifts to step ST303.

In step ST303, the distance image data generation unit 62C enlarges the region, which includes the second marks M2r and M2f in the distance image data 82, in the second axis A2 direction. In step ST303, after the processing of enlarging the region, which includes the second marks M2r and M2f, in the second axis A2 direction is performed, the enlargement processing shifts to step ST304.

In step ST304, the CPU 62 determines whether or not a condition for ending (hereinafter, referred to as an "end condition") the enlargement processing is satisfied. Examples of the end condition include a condition that it is detected that the imaging instruction has been given through the release button 22 (see FIG. 1). In step ST304, in a case in which the end condition is not satisfied, the determination is set as negative, and the enlargement processing shifts to step ST300. In step ST304, in a case in which the end condition is satisfied, the determination is set as positive, and the enlargement processing is ended.

In the present modification example, the user can partially enlarge the distance image data 82 according to the operation, and can easily adjust and check the depth of field with respect to the subject based on an enlarged image.

Fifth Modification Example

The imaging apparatus 10 according to a fifth modification example differs from the imaging apparatus 10 according to the second modification example in that the color of the corresponding area in the moving image data 80 is changed in a case where the user performs an operation of designating a region with respect to the distance image data 82 displayed on the touch panel display 32.

Figure 22:
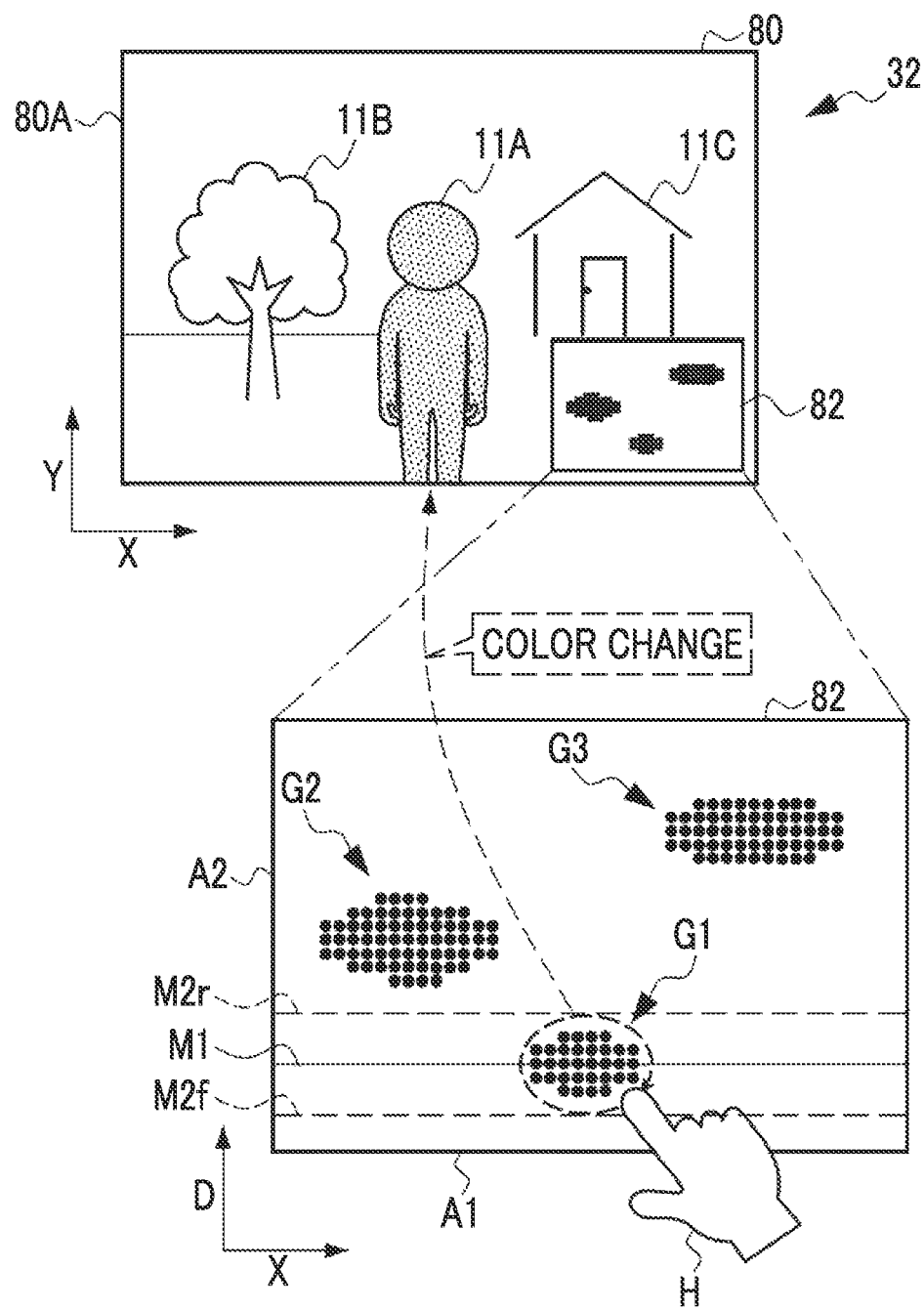
FIG. 22 is a diagram showing an example of a region designation operation according to a fifth modification example.

As an example shown in FIG. 22, the moving image data generation unit 62A of the present embodiment specifies, in the moving image data 80, a pixel group corresponding to a region designated in the distance image data 82 and changes the color of the specified pixel group.

In the example shown in FIG. 22, the user designates a region, which includes the set G1, based on the distance image data 82 by performing an operation of enclosing the set G1 in a circle with the finger of the hand H. In the present example, the moving image data generation unit 62A changes the color of the pixel group (that is, the pixel group corresponding to the person 11A), which corresponds to the set G1 of the moving image data 80, to specific color. Changing the color also includes changing the density.

According to the present modification example, the user can easily check the relationship between the region, which is designated in the distance image data 82, and the subject in the moving image data 80.

Further, in the present modification example, the lens control unit 62E may control the focus lens 40B and/or the stop 40D such that the region, which is designated in the distance image data 82, is within the depth of field. As a result, the first mark M1 or the second marks M2r and M2f are moved according to the designated region. Accordingly, the user can intuitively perform the manual focusing and/or the adjustment of the stop value.

Sixth Modification Example

The imaging apparatus 10 according to a sixth modification example differs from the imaging apparatus 10 according to the second modification example in that the color of the corresponding area in the distance image data 82 is changed in a case where the user performs an operation of designating a region with respect to the moving image data 80 displayed on the touch panel display 32.

Figure 23:
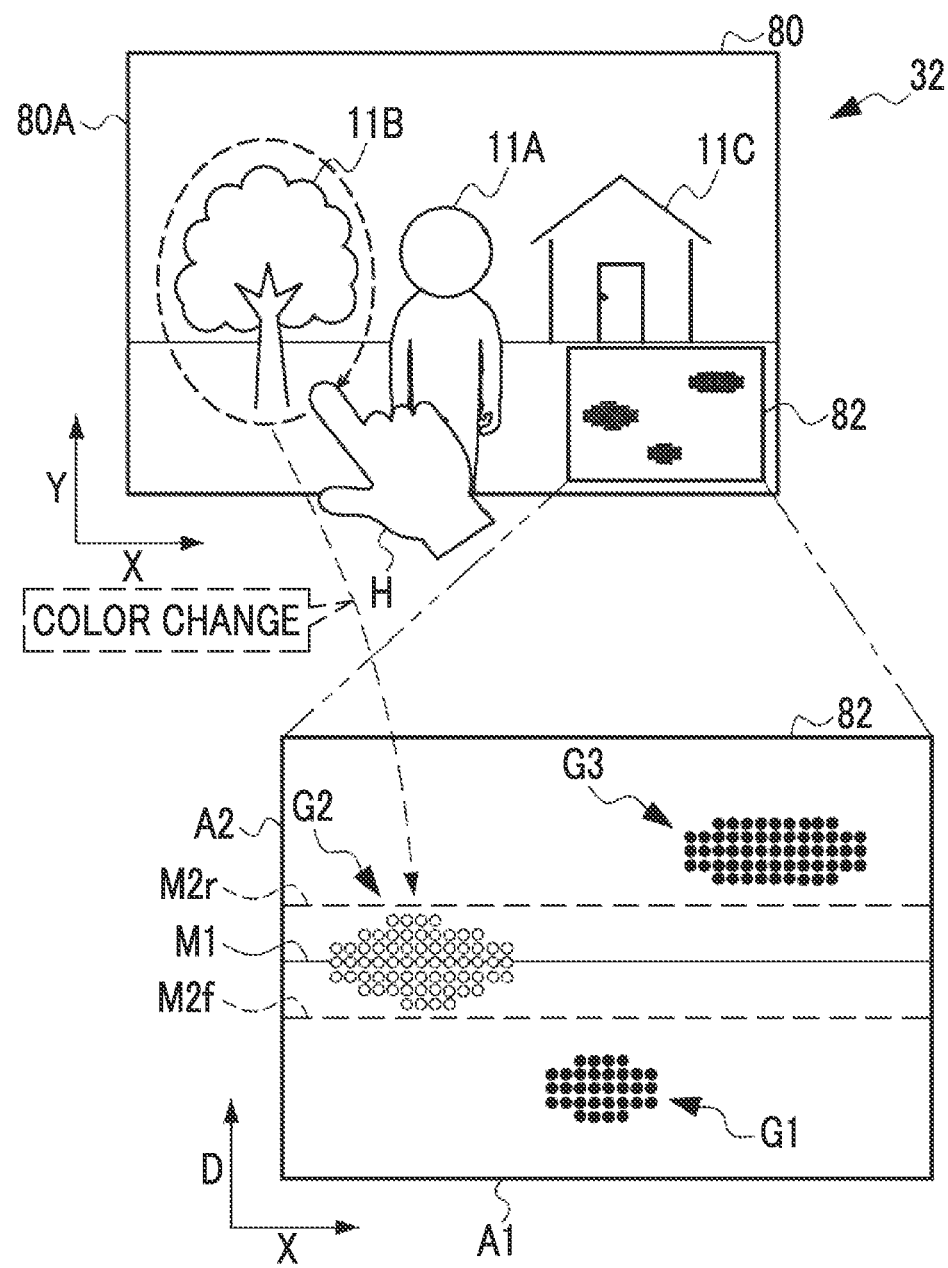
FIG. 23 is a diagram showing an example of a region designation operation according to a sixth modification example.

As an example shown in FIG. 23, the distance image data generation unit 62C of the present embodiment specifies, in the distance image data 82, a pixel group corresponding to a region designated in the moving image data 80 and changes the color of the specified pixel group.

In the example shown in FIG. 23, the user designates a region, which includes the tree 11B, in the moving image data 80 by performing an operation of enclosing the tree 11B in a circle with the finger of the hand H. In the present example, the distance image data generation unit 62C changes the color of the pixel group (that is, the pixel group of the set G2), which corresponds to the tree 11B in the distance image data 82, to a specific color. Changing the color also includes changing the density.

According to the present modification example, the user can easily check the distance of the region, which is designated in the moving image data 80, in the distance image data 82.

Further, in the present modification example, the lens control unit 62E may control the focus lens 40B and/or the stop 40D such that the region, which is designated in the moving image data 80, is within the depth of field. As a result, the first mark M1 or the second marks M2r and M2f are moved according to the designated region. Accordingly, the user can intuitively perform the manual focusing and/or the adjustment of the stop value.

Seventh Modification Example

The imaging apparatus 10 according to a seventh modification example differs from the imaging apparatus 10 according to the second modification example in that the distance information is displayed only in the corresponding region in the distance image data 82 in a case where the user performs an operation of designating a region with respect to the moving image data 80 displayed on the touch panel display 32.

Figure 24:
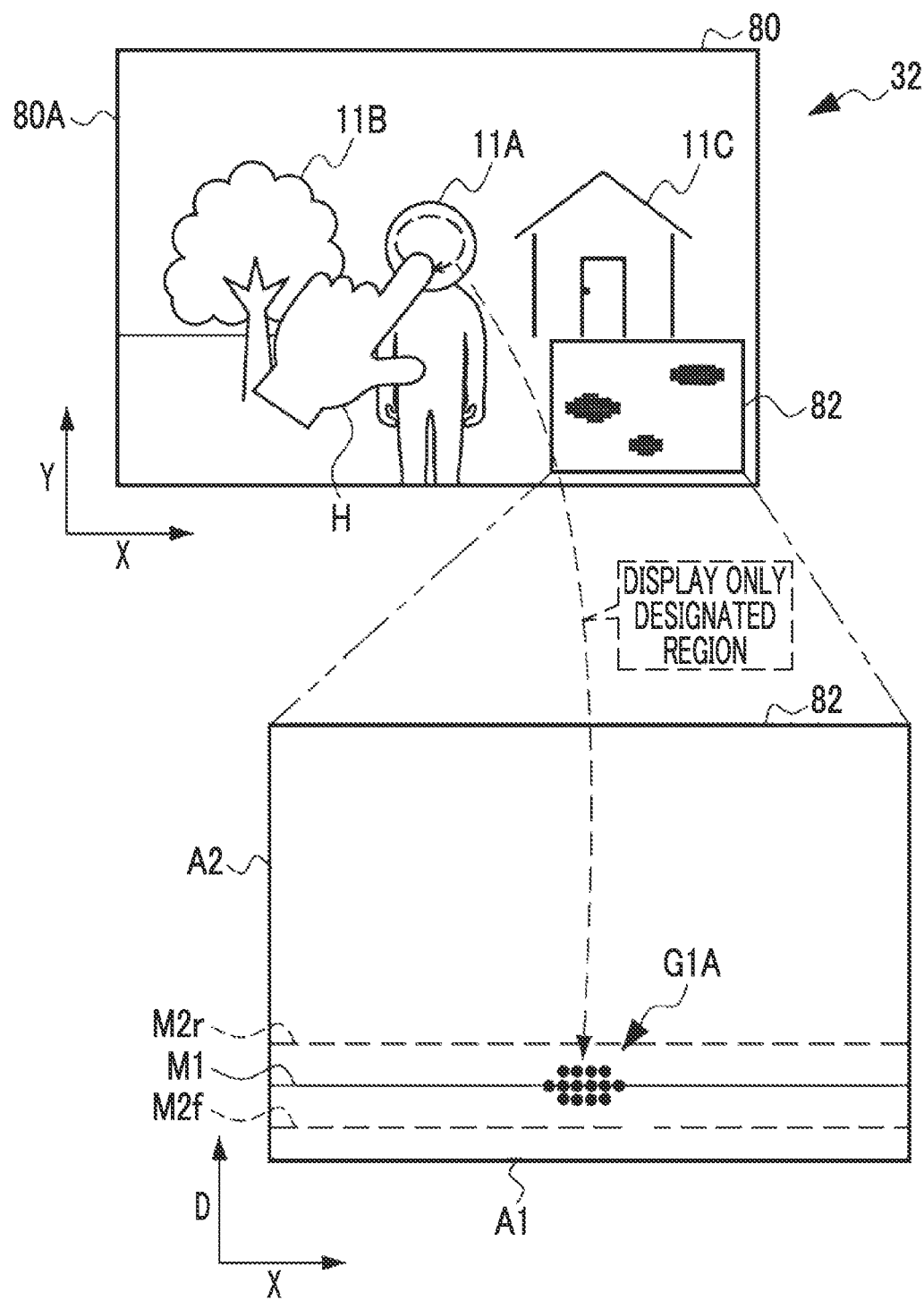
FIG. 24 is a diagram showing an example of a region designation operation according to a seventh modification example.

As an example shown in FIG. 24, the distance image data generation unit 62C of the present embodiment generates the distance image data 82 based only on the distance information 84 corresponding to the region designated in the moving image data 80.

In the example shown in FIG. 24, the user designates a region in the moving image data 80 by performing an operation of enclosing the face portion of the person 11A in a circle with the finger of the hand H. In the present example, the distance image data generation unit 62C generates the distance image data 82 based only on the distance information 84 corresponding to the face portion of the person 11A. As a result, only a part of the set G1A in the set G1 corresponding to the person 11A is displayed in the distance image data 82.

According to the present modification example, the user can check the distance information of the subject only in the region designated in the moving image data 80. Further, since the distance image data generation unit 62C generates the distance image data 82 based only on the distance information 84 corresponding to the designated region, generation processing of the distance image data 82 is accelerated.

Further, in the present modification example, the lens control unit 62E may control the focus lens 40B and/or the stop 40D such that the region, which is designated in the moving image data 80, is within the depth of field. As a result, the first mark M1 or the second marks M2r and M2f are moved according to the designated region. Accordingly, the user can intuitively perform the manual focusing and/or the adjustment of the stop value.

Further, the distance image data generation unit 62C may generate the distance image data 82 based only on the distance information 84 corresponding to a subject region that is extracted by the subject extraction unit 62F shown in the third modification example. In this case, the position and/or the size of the subject region, which is extracted by the subject extraction unit 62F, is changed depending on the movement of the subject or the imaging apparatus 10. Since the distance image data generation unit 62C repeatedly performs the generation of the distance image data 82 for each certain period of time, the distance image data 82 is changed according to the change in the position and/or size of the subject region.

Eighth Modification Example

In the above-described embodiment and each of the above-described modification examples, the distance image data 82 is displayed (that is, the PinP display) in a state of being superimposed on the moving image data 80 (see, for example, FIG. 8). The display aspect of the distance image data 82 is not limited to the PinP display. For example, the distance image data 82 and the moving image data 80 may be displayed side by side.

Figure 25:
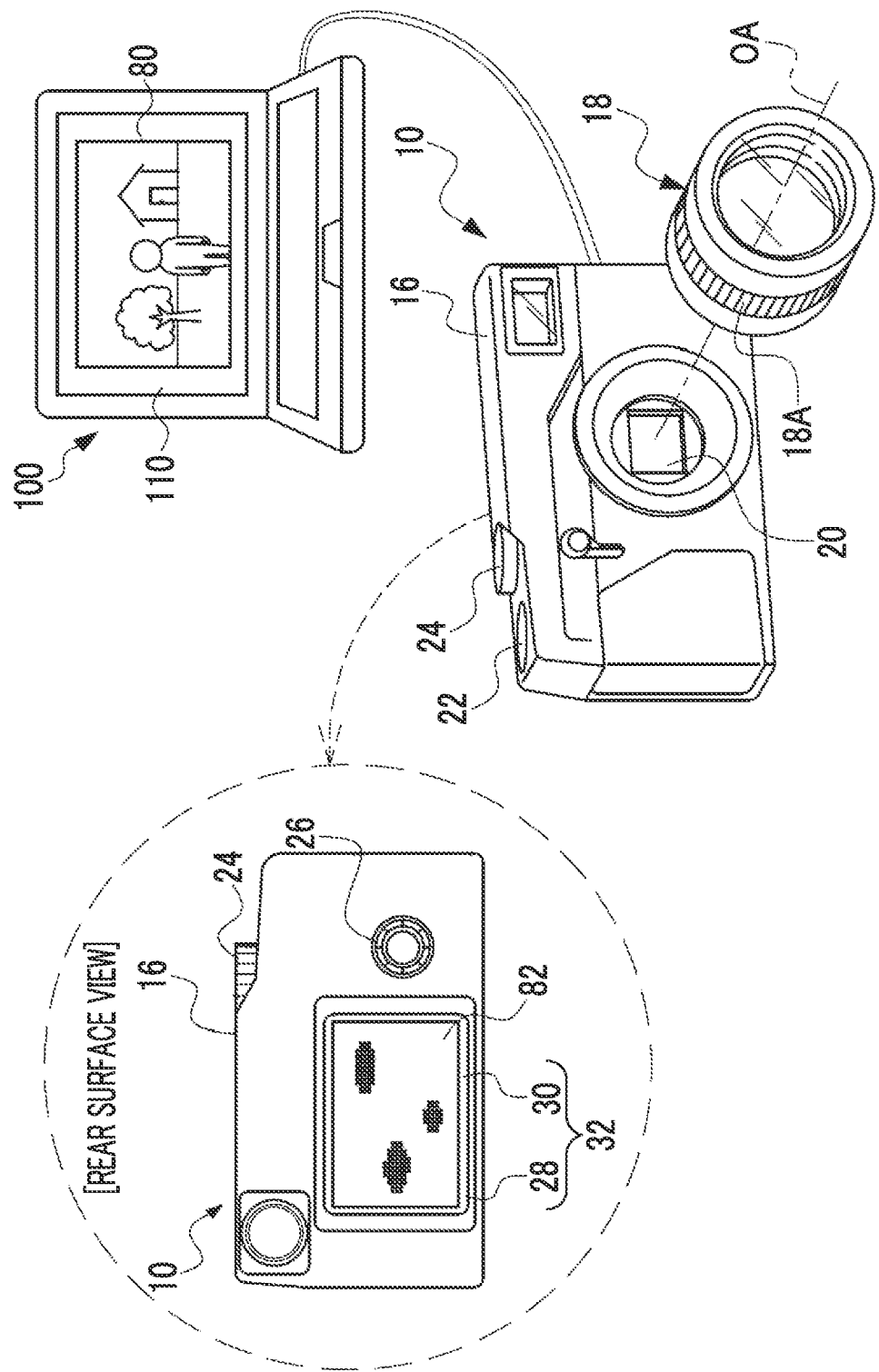
FIG. 25 is a diagram illustrating a remote imaging according to an eighth modification example.

Further, the distance image data 82 and the moving image data 80 may be output to different display destinations from each other. As an example shown in FIG. 25, in the remote imaging performed by connecting an imaging apparatus 10 to a PC 100 as an external apparatus, the moving image data 80 may be displayed on a display 110 of the PC 100 and the distance image data 82 may be displayed on the display 28 of the imaging apparatus 10. The imaging apparatus 10 and the PC 100 are connected by wire or wirelessly. The moving image data 80, which is generated by the imaging apparatus 10, is transferred to the PC 100, and the live view image is displayed on the display 110 of the PC 100.

Further, the moving image data 80 according to the present disclosed technology is not limited to the moving image data for the live view image, and the moving image data 80 may be moving image data for recording to be recorded in an internal memory or an external memory according to the operation of the release button 22. As described in the fifth modification example, in a case where a part of the color of the moving image data 80 is changed, it is preferable that the color of the moving image data for recording is not changed.

Each of the above-mentioned embodiments and the modification examples can be combined with each other as long as no contradiction occurs.

Further, in the above embodiment, although the CPU 62 is exemplified, at least one other CPU, at least one GPU, and/or at least one TPU may be used instead of the CPU 62 or together with the CPU 62.

In the above embodiment, although an example of the embodiment in which the program 65 is stored in the NVM 64 has been described, the present disclosed technology is not limited to this. For example, the program 65 may be stored in a portable non-temporary storage medium such as an SSD or a USB memory. The program 65 stored in the non-temporary storage medium is installed in the processor 12 of the imaging apparatus 10. The CPU 62 executes the focus assist processing according to the program 65.

Further, the program 65 may be stored in the storage device such as another computer or a server device connected to the imaging apparatus 10 via the network, the program 65 may be downloaded in response to the request of the imaging apparatus 10, and the program 65 may be installed in the processor 12.

It is not necessary to store all of the programs 65 in the storage device such as another computer or a server device connected to the imaging apparatus 10, or the NVM 64, and a part of the program 65 may be stored.

Further, although the imaging apparatus 10 shown in FIG. 1 and FIG. 2 has a built-in processor 12, the present disclosed technology is not limited to this, for example, the processor 12 may be provided outside the imaging apparatus 10.

In the above embodiment, although the processor 12, which includes the CPU 62, NVM 64, and RAM 66, is exemplified, the present disclosed technology is not limited to this, and a device including an ASIC, FPGA, and/or PLD may be applied instead of the processor 12. Further, instead of the processor 12, a combination of a hardware configuration and a software configuration may be used.

As a hardware resource for executing the focus assist processing described in the embodiment, the following various processors can be used. Examples of the processors include a CPU which is a general-purpose processor functioning as the hardware resource for executing the focus assist processing by executing software, that is, a program. Further, examples of the processor include a dedicated electric circuit, which is a processor having a circuit configuration specially designed for executing specific processing such as FPGA, PLD, or ASIC. A memory is built in or connected to any processor, and any processor executes the focus assist processing by using the memory.

The hardware resource for executing the focus assist processing may be composed of one of these various processors, or may be composed of a combination (for example, a combination of a plurality of FPGAs or a combination of a CPU and an FPGA) of two or more processors of the same type or different types. In addition, the hardware resource for executing the focus assist processing may be one processor.

As a configuring example of one processor, first, there is a form in which one processor is composed of a combination of one or more CPUs and software and the processor functions as the hardware resource for executing the focus assist processing. Secondly, as represented by SoC, there is a form in which a processor that realizes the functions of the entire system including a plurality of hardware resources for executing the focus assist processing with one IC chip is used. As described above, the focus assist processing is realized by using one or more of the various processors as the hardware resources.

Further, as the hardware-like structure of these various processors, more specifically, an electric circuit in which circuit elements such as semiconductor elements are combined can be used. In addition, the focus assist processing described above is merely an example. Therefore, it goes without saying that unnecessary steps may be deleted, new steps may be added, or the processing order may be changed within a range that does not deviate from the purpose.

The contents described above and the contents shown in the illustration are detailed explanations of the parts related to the present disclosed technology and are only an example of the present disclosed technology. For example, the description related to the configuration, function, action, and effect described above is an example related to the configuration, function, action, and effect of a portion according to the present disclosed technology. Therefore, it goes without saying that unnecessary parts may be deleted, new elements may be added, or replacements may be made to the contents described above and the contents shown in the illustration, within the range that does not deviate from the purpose of the present disclosed technology. Further, in order to avoid complications and facilitate understanding of the parts of the present disclosed technology, in the contents described above and the contents shown in the illustration, the descriptions related to the common technical knowledge or the like that do not require special explanation in order to enable the implementation of the present disclosed technology are omitted.

In the present specification, "A and/or B" is synonymous with "at least one of A or B". That is, "A and/or B" means that it may be only A, it may be only B, or it may be a combination of A and B. Further, in the present specification, in a case where three or more matters are connected and expressed by "and/or", the same concept as "A and/or B" is applied.

All documents, patent applications, and technical standards described in the present specification are incorporated in the present specification by reference to the same extent in a case where it is specifically and individually described that the individual documents, the patent applications, and the technical standards are incorporated by reference.

What is claimed is:

1. An imaging apparatus comprising:
an image sensor;
a focus lens; and
a processor,
wherein the processor is configured to:
acquire information related to distances at a plurality of positions within an imaging area of the image sensor;
generate moving image data represented with a vertical axis and a lateral axis, based on imaging data obtained by the image sensor;
generate distance image data in which a first axis corresponds to the vertical axis or the lateral axis and a second axis represents the information related to the distance, wherein the distance image data includes information representing at least one of a first mark that indicates a focusing distance or a second mark that indicates a depth of field; and
output the moving image data and the distance image data,
wherein the processor is configured to:
perform control of moving the focus lens to a position corresponding to the focusing distance represented by the first mark, in a case where an operation of changing a position of the first mark along the second axis is received.

2. The imaging apparatus according to claim 1, wherein the processor is configured to output the moving image data and the distance image data to a display destination.

3. The imaging apparatus according to claim 1, further comprising:
a stop,
wherein the processor is configured to
perform control of changing a stop value of the stop to a stop value corresponding to the depth of field represented by the second mark, in a case where an operation of changing a position of the second mark along the second axis is received.

4. The imaging apparatus according to claim 3, wherein the processor is configured to
control at least one of the focus lens or the stop with a range in which a target subject in the moving image data is within the depth of field, in a case where the operation of changing the position of the first mark or the second mark is performed.

5. The imaging apparatus according to claim 4, wherein the target subject is a subject extracted by the processor based on the moving image data.

6. The imaging apparatus according to claim 4, wherein the target subject is a subject obtained by the processor extracting a designated region, which is designated in the moving image data, in a case where an operation of designating a region in the moving image data is performed.

7. The imaging apparatus according to claim 4, wherein the processor is configured to
perform processing of enlarging the distance image data in a direction of the second axis, in a case where an operation of widening the depth of field by using the second mark is performed.

8. The imaging apparatus according to claim 4, wherein the processor is configured to
perform processing of enlarging the distance image data in a direction of the second axis, in a case where a state in which an operation speed is equal to or lower than a certain speed continues for a certain period of time during the operation of changing the position of the first mark or the second mark.

9. The imaging apparatus according to claim 1, wherein the processor is configured to,
in the moving image data, change color of a pixel group corresponding to a region designated in the distance image data, in a case where an operation of designating the region in the distance image data is performed.

10. The imaging apparatus according to claim 1, wherein the processor is configured to,
in the distance image data, change color of a pixel group corresponding to a region designated in the moving image data, in a case where an operation of designating the region in the moving image data is performed.

11. The imaging apparatus according to claim 1,
wherein the processor is configured to:
extract a subject region based on the moving image data;
acquire information related to the distance corresponding to the extracted subject region; and
generate the distance image data based on the acquired information related to the distance.

12. The imaging apparatus according to claim 1,
wherein the processor is configured to:
extract a designated region, which is designated in the moving image data, in a case where an operation of designating a region in the moving image data is performed;
acquire information related to the distance corresponding to the extracted designated region; and
generate the distance image data based on the acquired information related to the distance.

13. The imaging apparatus according to claim 1,
wherein the processor is configured to
acquire the information related to the distance based on the imaging data obtained by the image sensor.

14. The imaging apparatus according to claim 13,
wherein the image sensor includes a plurality of phase difference pixels, and
the processor is configured to
acquire the information related to the distance based on, among the imaging data, imaging data that is obtained from the phase difference pixel.

15. The imaging apparatus according to claim 14,
wherein the phase difference pixel is capable of selectively outputting non-phase difference image data, which is obtained by performing photoelectric conversion in an entire region of a pixel, and phase difference image data, which is obtained by performing the photoelectric conversion in a part of region of the pixel, and
the processor is configured to
acquire the information related to the distance based on the imaging data in a case where the phase difference pixel outputs the phase difference image data.

16. An information processing method comprising:
acquiring information related to distances at a plurality of positions within an imaging area of an image sensor;
generating moving image data represented with a vertical axis and a lateral axis, based on imaging data obtained by the image sensor;
generating distance image data in which a first axis corresponds to the vertical axis or the lateral axis and a second axis represents the information related to the distance, wherein the distance image data includes information representing at least one of a first mark that indicates a focusing distance or a second mark that indicates a depth of field;
performing control of moving a focus lens to a position corresponding to the focusing distance represented by the first mark, in a case where an operation of changing a position of the first mark along the second axis is received; and
outputting the moving image data and the distance image data.

17. A non-transitory computer-readable storage medium storing a program causing a computer to execute a process comprising:
acquiring information related to distances at a plurality of positions within an imaging area of an image sensor;
generating moving image data represented with a vertical axis and a lateral axis, based on imaging data obtained by the image sensor;
generating distance image data in which a first axis corresponds to the vertical axis or the lateral axis and a second axis represents the information related to the distance, wherein the distance image data includes information representing at least one of a first mark that indicates a focusing distance or a second mark that indicates a depth of field;
performing control of moving a focus lens to a position corresponding to the focusing distance represented by the first mark, in a case where an operation of changing a position of the first mark along the second axis is received; and
outputting the moving image data and the distance image data.

\* \* \* \* \*